(12) United States Patent
Dong et al.

(10) Patent No.: US 11,803,305 B1
(45) Date of Patent: Oct. 31, 2023

(54) WEAR LEVELING BETWEEN STORAGE DEVICES OF A STORAGE SYSTEM BASED ON INPUT/OUTPUT PATTERNS OF STORAGE OBJECTS

(71) Applicant: Dell Products L.P., Round Rock, TX (US)

(72) Inventors: Hailan Dong, Chengdu (CN); Chi Chen, Chengdu (CN); Fanliang Lin, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/743,860

(22) Filed: May 13, 2022

(30) Foreign Application Priority Data

Apr. 21, 2022 (CN) .......................... 202210432672.4

(51) Int. Cl.
G06F 3/06 (2006.01)
G06F 12/02 (2006.01)

(52) U.S. Cl.
CPC ............ *G06F 3/061* (2013.01); *G06F 3/0616* (2013.01); *G06F 3/0653* (2013.01); *G06F 3/0679* (2013.01); *G06F 12/0246* (2013.01); *G06F 2212/7211* (2013.01)

(58) Field of Classification Search
CPC ...... G06F 3/061; G06F 3/0616; G06F 3/0653; G06F 3/0679; G06F 12/0246; G06F 2212/7211
See application file for complete search history.

(56) References Cited

U.S. PATENT DOCUMENTS

| | | | | |
|---|---|---|---|---|
| 9,811,288 | B1 * | 11/2017 | Chen | ...................... G06F 3/0685 |
| 11,262,918 | B1 * | 3/2022 | Venugopal | ............ G06F 3/0616 |
| 2013/0179631 | A1 * | 7/2013 | Cepulis | ................. G06F 3/0604 |
| | | | | 711/103 |
| 2014/0122774 | A1 * | 5/2014 | Xian | ................... G06F 12/0246 |
| | | | | 711/E12.008 |

(Continued)

OTHER PUBLICATIONS

NVM Express, NVM Express, Revision 1.3, NVM Express, May 1, 2017, 282 pages.

(Continued)

*Primary Examiner* — Larry T Mackall
(74) *Attorney, Agent, or Firm* — Ryan, Mason & Lewis, LLP

(57) ABSTRACT

An apparatus comprises a processing device configured to monitor input/output (IO) operations for storage objects stored on storage devices of a storage system for a designated period of time, to identify IO patterns associated with the storage objects, wherein the IO patterns are associated with different wear level impacts on the storage devices of the storage system, and to determine a wear status of each storage device of the storage system. The processing device is also configured to select one or more storage objects to move from a first to a second storage device of the storage system based at least in part on the monitored input/output operations, the identified IO patterns, and the determined wear status of each storage device. The processing device is further configured to move the selected storage objects from the first to the second storage device to perform wear level balancing for the storage system.

20 Claims, 31 Drawing Sheets

(56) References Cited

U.S. PATENT DOCUMENTS

2017/0109094 A1* 4/2017 Peng .................. G06F 3/0638

OTHER PUBLICATIONS

Dell EMC, "Dell EMC Unity: Data Integrity," White Paper, Mar. 2018, 20 pages.
Dell Technologies, "Dell EMC VMAX All Flash: Family Overview," Technical White Paper, Sep. 2020, 40 pages.
Dell Technologies, "Dell EMC Unity: Unisphere Overview," Technical White Paper, Feb. 2020, 41 pages.
EMC2, "FAST.X with EMC CloudArray," White Paper, Sep. 2015, 11 pages.
Dell EMC "Dell EMC VMAX All Flash and VMAX3: Reliability, Availability, and Serviceability," Technical White Paper, Dec. 2020, 57 pages.
Dell EMC, "Dell EMC VMAX3 Family," Data Sheet, Nov. 2016, 8 pages.
J. Li et al., "Pattern-based Write Scheduling and Read Balance-oriented Wear-leveling for Solid State Drivers," 35th Symposium on Mass Storage Systems and Technologies, May 20-24, 2019, 9 pages.

* cited by examiner

| NAME | TYPE | CAPACITY (GB) | ESTIMATED END OF LIFE (EOL) (DAYS) |
|---|---|---|---|
| DRIVE 1 | SAS FLASH | 733.5 | 1807 |
| DRIVE 2 | SAS FLASH | 733.5 | 1752 |
| DRIVE 3 | SAS FLASH | 733.5 | 1807 |
| DRIVE 4 | SAS FLASH | 733.5 | 1789 |
| DRIVE 5 | SAS FLASH | 733.5 | 1807 |
| DRIVE 6 | SAS FLASH | 733.5 | 1789 |
| DRIVE 7 | SAS FLASH | 733.5 | 1752 |
| DRIVE 8 | SAS FLASH | 733.5 | 1807 |
| DRIVE 9 | SAS FLASH | 733.5 | 1789 |
| DRIVE 10 | SAS FLASH | 733.5 | 1807 |
| DRIVE 11 | SAS FLASH | 733.5 | 1789 |
| DRIVE 12 | SAS FLASH | 733.5 | 1789 |
| DRIVE 13 | SAS FLASH | 733.5 | 1789 |
| DRIVE 14 | SAS FLASH | 733.5 | 1789 |

FIG. 11

| SSD | RELOCATE UNIT | IO WRITE PATTERN OF RELOCATE UNIT $p_i$ | IO COUNT | IO WRITE PATTERN WEAR SCORE $s_i$ | RELOCATE UNIT TEMPERATURE $t_k$ | WEAR STATUS $R_l$ | WEAR IMBALANCE RATE $\lambda$ |
|---|---|---|---|---|---|---|---|
| SSD 1 | $o_1$ | 4K_0R_100s | 500 | 0.09315979 | 46 | 0.255471773 | 0.197454696 |
|  | $o_4$ | 128K_0R_100s | 300 | 2.728148633 | 818 |  |  |
| SSD2 | $o_2$ | 8K_0R_0s | 800 | 0.181876576 | 145 | 0.329775709 |  |
|  | $o_3$ | 128K_0R_0s | 100 | 2.736568845 | 273 |  |  |
| SSD 3 | $o_5$ | 4K_0R_0s | 2000 | 0.09857809 | 197 | 0.414752518 |  |
|  | $o_6$ | 8K_0R_100s | 500 | 0.161668067 | 80 |  |  |

WEAR LEVELING BETWEEN STORAGE DEVICES OF A STORAGE SYSTEM BASED ON INPUT/OUTPUT PATTERNS OF STORAGE OBJECTS

RELATED APPLICATION

The present application claims priority to Chinese Patent Application No. 202210432672.4, filed on Apr. 21, 2022 and entitled "Wear Leveling Between Storage Devices of a Storage System Based on Input/Output Patterns of Storage Objects," which is incorporated by reference herein in its entirety.

FIELD

The field relates generally to information processing, and more particularly to storage in information processing systems.

BACKGROUND

Storage arrays and other types of storage systems are often shared by multiple host devices over a network. Applications running on the host devices each include one or more processes that perform the application functionality. Such processes issue input-output (IO) operation requests for delivery to the storage systems. Storage controllers of the storage systems service such requests for IO operations. In some information processing systems, multiple storage systems may be used to form a storage cluster.

SUMMARY

Illustrative embodiments of the present disclosure provide techniques for wear leveling between storage devices of a storage system based at least in part on input/output patterns of storage objects.

In one embodiment, an apparatus comprises at least one processing device comprising a processor coupled to a memory. The at least one processing device is configured to perform the steps of monitoring input/output operations for a plurality of storage objects for a designated period of time, each of the plurality of storage objects being stored on one of a set of two or more storage devices of a storage system, identifying input/output patterns associated with respective ones of the plurality of storage objects, wherein different ones of the input/output patterns are associated with different wear level impacts on the set of two or more storage devices of the storage system, and determining a wear status of each storage device in the set of two or more storage devices of the storage system. The at least one processing device is also configured to perform the step of selecting one or more storage objects of the plurality of storage objects to move from a first storage device in the set of two or more storage devices of the storage system to a second storage device in the set of two or more storage devices of the storage system based at least in part on (i) the monitored input/output operations for the plurality of storage objects, (ii) the identified input/output patterns associated with respective ones of the plurality of storage objects, and (iii) the determined wear status of each storage device in the set of two or more storage devices of the storage system. The at least one processing device is further configured to perform the step of moving the selected one or more storage objects from the first storage device to the second storage device to perform wear level balancing among the set of two or more storage devices of the storage system.

These and other illustrative embodiments include, without limitation, methods, apparatus, networks, systems and processor-readable storage media.

BRIEF DESCRIPTION OF THE DRAWINGS

FIG. 11 shows a table summarizing wear leveling for different storage drives of a storage array in an illustrative embodiment.

FIG. 15 shows a table illustrating input/output pattern wear levels of storage objects stored on storage drives in a storage array following relocation in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
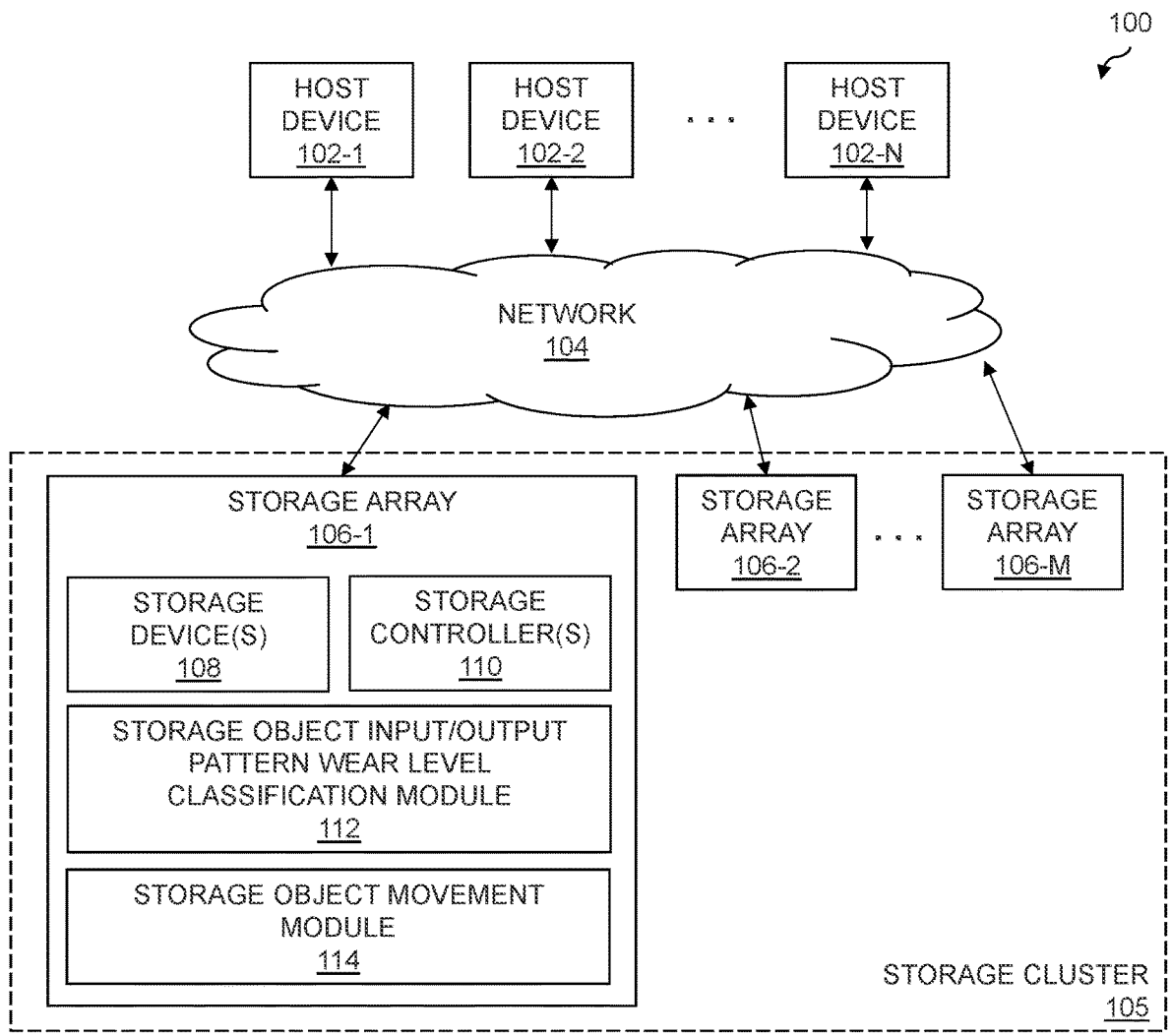
FIG. 1 is a block diagram of an information processing system for wear leveling between storage devices of a storage system based at least in part on input/output patterns of storage objects in an illustrative embodiment.

FIG. 1 shows an information processing system 100 configured in accordance with an illustrative embodiment to provide functionality for wear leveling between storage devices of a storage system based at least in part on input/output (IO) patterns of storage objects. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate input/output (IO) processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

In the information processing system 100 of FIG. 1, the storage arrays 106 are assumed to be part of a storage cluster 105 (e.g., where the storage arrays 106 may be used to implement one or more storage nodes in a cluster storage system comprising a plurality of storage nodes interconnected by one or more networks), and the host devices 102 are assumed to submit IO operations to be processed by the storage cluster 105. At least one of the storage controllers of the storage arrays 106 (e.g., the storage controller 110 of storage array 106-1) is assumed to implement functionality for intelligent data movement across the storage devices 108 of the storage array 106-1 (e.g., between different ones of the storage devices 108 or portions thereof, where in some cases the different storage devices 108 are part of or provide storage resources for different storage tiers in the storage cluster 105), and between the storage array 106-1 and one or more other ones of the storage arrays 106-2 through 106-M. Such intelligent data movement functionality is provided via a storage object IO pattern wear level classification module 112 and a storage object movement module 114.

As noted above, the storage arrays 106 in some embodiments are assumed to be part of the storage cluster 105. The storage cluster 105 is assumed to provide or implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

It should be appreciated that a multi-tier storage system may include more than two storage tiers, such as one or more "performance" tiers and one or more "capacity" tiers, where the performance tiers illustratively provide increased IO performance characteristics relative to the capacity tiers and the capacity tiers are illustratively implemented using relatively lower cost storage than the performance tiers. There may also be multiple performance tiers, each providing a different level of service or performance as desired, or multiple capacity tiers.

The storage object IO pattern wear level classification module 112 is configured to monitor IO operations for a plurality of storage objects for a designated period of time, each of the plurality of storage objects being stored on one of the storage devices 108 of the storage array 106-1. The storage object IO pattern wear level classification module 112 is also configured to identify IO patterns associated with respective ones of the plurality of storage objects, wherein different ones of the input/output patterns are associated with different wear level impacts on the storage devices 108. The storage object IO pattern wear level classification module 112 is further configured to determine a wear status of each of the storage devices 108, and to select one or more of the plurality of storage objects to move from a first one of the storage devices 108 to a second one of the storage devices 108 based at least in part on (i) the monitored IO operations for the plurality of storage objects, (ii) the identified IO patterns associated with respective ones of the plurality of storage objects, and (iii) the determined wear status of each of the storage devices 108. The storage object movement module 114 is configured to move the selected one or more storage objects from the first storage device to the second storage device to perform wear level balancing among the storage devices 108.

Although in the FIG. 1 embodiment the storage object IO pattern wear level classification module 112 and the storage object movement module 114 are shown as being implemented internal to the storage array 106-1 and outside the storage controllers 110, in other embodiments one or both of the storage object IO pattern wear level classification module 112 and the storage object movement module 114 may be implemented at least partially internal to the storage controllers 110 or at least partially outside the storage array 106-1, such as on one of the host devices 102, one or more other ones of the storage arrays 106-2 through 106-M, on one or more servers external to the host devices 102 and the storage arrays 106 (e.g., including on a cloud computing platform or other type of information technology (IT) infrastructure), etc. Further, although not shown in FIG. 1, other ones of the storage arrays 106-2 through 106-M may implement respective instances of the storage object IO pattern wear level classification module 112 and the storage object movement module 114.

At least portions of the functionality of the storage object IO pattern wear level classification module 112 and the storage object movement module 114 may be implemented at least in part in the form of software that is stored in memory and executed by a processor.

The host devices 102 and storage arrays 106 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage arrays 106 may be implemented on respective distinct processing platforms, although numerous other arrangements are possible. For example, in some embodiments at least portions of one or more of the host devices 102 and one or more of the storage arrays 106 are implemented on the same processing platform. One or more of the storage arrays 106 can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 may be implemented at least in part in the first geographic location, the second geographic location, and one or more other geographic locations. Thus, it is possible in some implementations of the system 100 for different ones of the host devices 102 and the storage arrays 106 to reside in different data centers.

Numerous other distributed implementations of the host devices 102 and the storage arrays 106 are possible. Accordingly, the host devices 102 and the storage arrays 106 can also be implemented in a distributed manner across multiple data centers.

Additional examples of processing platforms utilized to implement portions of the system 100 in illustrative embodiments will be described in more detail below in conjunction with FIGS. 17 and 18.

It is to be understood that the particular set of elements shown in FIG. 1 for wear leveling between storage devices of a storage system based at least in part on IO patterns of storage objects is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
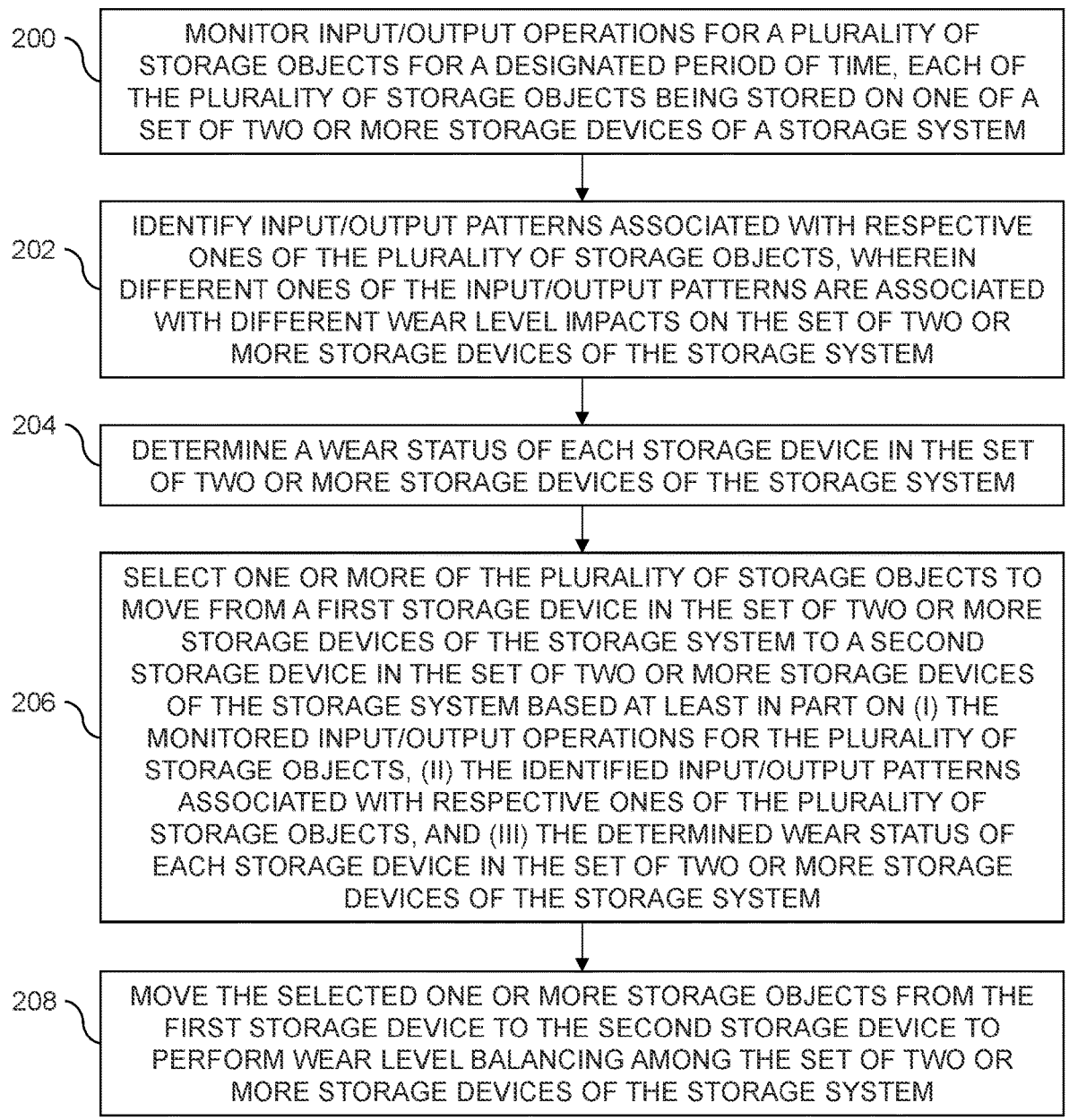
FIG. 2 is a flow diagram of an exemplary process for wear leveling between storage devices of a storage system based at least in part on input/output patterns of storage objects in an illustrative embodiment.

An exemplary process for wear leveling between storage devices of a storage system based at least in part on IO patterns of storage objects will now be described in more detail with reference to the flow diagram of FIG. 2. It is to be understood that this particular process is only an example, and that additional or alternative processes for wear leveling between storage devices of a storage system based at least in part on IO patterns of storage objects may be used in other embodiments.

In this embodiment, the process includes steps 200 through 208. These steps are assumed to be performed by the storage object IO pattern wear level classification module 112 and the storage object movement module 114. The process begins with step 200, monitoring IO operations for a plurality of storage objects for a designated period of time, each of the plurality of storage objects being stored on one of a set of two or more storage devices (e.g., 108) of a storage system (e.g., 105, 106). In step 202, IO patterns associated with respective ones of the plurality of storage objects are identified. Different ones of the IO patterns are associated with different wear level impacts on the set of two or more storage devices of the storage system. Identifying a given IO pattern associated with a given storage object of the plurality of storage objects is based at least in part on a size of the given storage object, a ratio of read operations to write operations for the given storage object for the designated period of time, and a ratio of sequential IO operations to random IO operations involving the given storage object for the designated period of time.

A wear status of each storage device in the set of two or more storage devices of the storage system is determined in step 204. Determining the wear status for a given storage device in the set of two or more storage devices of the storage system may be based at least in part on: a wear level of the given storage device; an IO activity level of the given storage device; and capacity usage of the given storage device. The wear level of the given storage device may be determined based at least in part on an accumulated write request count for the given storage device. The IO level of the given storage devices may be determined based at least in part on a sum of counts of the monitored IO operations for a subset of the plurality of storage objects stored on the given storage device.

In step 206, one or more of the plurality of storage objects are selected to move from a first storage device in the set of two or more storage devices of the storage system to a second storage device in the set of two or more storage devices of the storage system based at least in part on (i) the monitored IO operations for the plurality of storage objects, (ii) the identified IO patterns associated with respective ones of the plurality of storage objects, and (iii) the determined wear status of each storage device in the set of two or more storage devices of the storage system. The first storage device may have a first wear level greater than a second wear level of the second storage device. The one or more of the plurality of storage objects are selected based at least in part on storage object relocation unit temperature values associated with each of a subset of the plurality of storage objects stored on the first storage device, the storage object relocation unit temperature values being based at least in part on: IO activity levels of respective ones of the storage objects in the subset of the plurality of storage objects stored on the first storage device; and erase scores for the IO patterns associated with respective ones of the storage objects in the subset of the plurality of storage objects stored on the first storage device, a given erase score for a given IO pattern being determined based at least in part on an average erase count per IO operation of the given IO pattern and an average erase count per IO operation of all IO patterns.

The selected one or more storage objects are moved from the first storage device to the second storage device in step 208 to perform wear level balancing among the set of two or more storage devices of the storage system. Steps 206 and 208 may be performed responsive to identifying that a wear level difference among the set of two or more storage devices of the storage system is greater than a designated threshold. Steps 204, 206 and 208 may be repeated until the wear level difference among the set of two or more storage devices of the storage system is equal to or lower than the designated threshold.

The set of two or more storage devices of the storage system may be part of a same one of two or more storage tiers in the storage system. The storage system may comprise a clustered storage system (e.g., 105) comprising two or more storage arrays (e.g., 106). The first storage device and the second storage device may be part of a given one (e.g., 106-1) of the two or more storage arrays, and wherein movement of the selected one or more storage objects of the plurality of storage objects improves wear level balancing of the given one of the two or more storage arrays. Alternatively, the first storage device is part of a first one (e.g., 106-1) of the two or more storage arrays, the second storage device is part of a second one (e.g., 106-2) of the two or more storage arrays, and the movement of the selected one or more storage objects of the plurality of storage objects improves wear level balancing between the first and second ones of the two or more storage arrays. The first storage device and the second storage device may comprise a same storage device type (e.g., SSDs).

Conventional approaches for wear leveling do not consider the impact of different IO patterns (e.g., different write patterns) on wear leveling. As an example, different write patterns may have different impacts on SSD erasing, but conventional approaches treat all writes as the same. The different write operations, however, have different erase impacts for SSDs. Write operations with bigger size result in more erasing than write operations with smaller size, and thus increased impact to SSDs (and other types of storage devices). Random write operations may also result in more erasing than sequential write operations, and are thus more impactful to SSDs (and possibly other types of storage devices) than sequential write operations.

Illustrative embodiments provide approaches for calculating IO pattern wear scores, and for leveraging IO pattern wear scores into a storage object relocation unit's associated "temperature" calculation such that storage object relocation based on storage object temperature will take into account the differing impact of different IO patterns (e.g., different write patterns) on SSD or other storage device wear. SSD or other storage device wear status is also taken into account for storage object relocation. The techniques described herein can thus further generate improved storage object relocation guides used for performing wear leveling in storage arrays.

Figure 3:
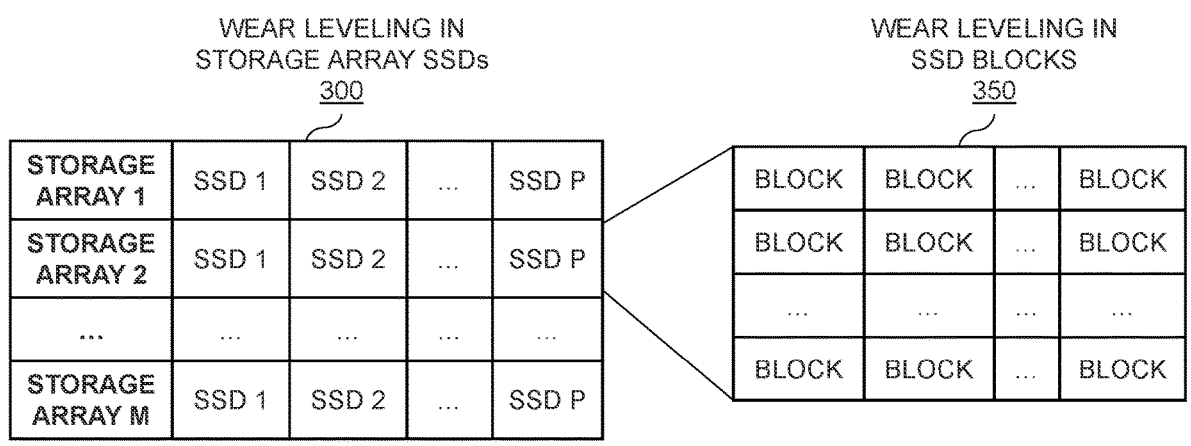
FIG. 3 shows wear leveling among storage blocks of solid state drives and among solid state drives in a storage array in an illustrative embodiment.

Wear leveling is a technique for prolonging the service life of storage devices (e.g., flash media, SSDs, etc.). Wear leveling techniques or mechanisms may have two dimensions: an internal storage device dimension and a storage array dimension. This is illustrated in FIG. 3, which shows how wear leveling in the storage array dimension 300 may be performed across SSDs 1, 2, . . . P of storage arrays 1, 2, . . . M (and potentially between the different storage arrays). Within each SSD or other storage device, wear leveling at the SSD or other storage device dimension 350 may also be performed among the different blocks or other portions of that SSD or other storage device. SSD life longevity may be limited by its read/write number. Frequent erasure of the same storage unit (e.g., for reads the storage unit may be a page level, for writes the storage unit may be a block level) of an SSD will lead to permanent damage to that storage unit. To avoid this scenario, each SSD may implement wear leveling for its pages, blocks or other storage units. SSDs and other storage devices may combine static and dynamic wear leveling algorithms via re-mapping the physical and logical addresses to balance the data stored in the SSD. For example, as shown in FIG. 3, wear leveling in the SSD or other storage device dimension 350 may balance usage of the different blocks within each SSD.

From a storage array view, each storage array may support multiple endurance levels of SSDs or other storage devices in storage pools. If data access patterns cause excessive wear to a particular set of SSDs or other storage devices, such SSDs or other storage devices may reach their end-of-life before the warranty period of the storage array expires. For example, if a storage array is expected to be used for 5 years (e.g., its has a 5-year warranty), then the SSDs on the storage array should not reach their end-of-life before 5 years. Wear leveling in the storage array dimension 300 may balance IO load and mitigate SSD wear at the drive or storage device level to prevent excessive wearing of SSDs or other storage devices, and mitigating uneven wear among the SSDs or other storage devices of a storage array. IO load balancing may also be performed among multiple different storage arrays to facilitate wear leveling (e.g., for a group of storage arrays that are part of a same storage cluster).

Across both the storage array dimension 300 and the SSD or other storage device dimension 350, wear leveling mechanisms seek to balance usage and prolong the life of SSDs or other storage devices, though at different balance units (e.g., at the SSD or storage device level for the wear leveling in the storage array dimension 300, at the block level for wear leveling in the SSD or other storage device dimension 350).

The wear leveling in the storage array dimension 300 may be based on or utilize multiple algorithms, including: a storage object relocation unit temperature calculation algorithm; an SSD or other storage device wear status calculation algorithm; and a storage object relocation algorithm that takes into account storage object relocation unit and SSD or other storage device wear degree. The storage object relocation unit temperature calculation algorithm divides SSDs or other storage devices of a storage array or other storage system into small storage object relocation units (e.g., disk extents, slices, etc.) which can be relocated among the SSDs or other storage devices of the storage array or other storage system. The "temperature" of each storage object relocation unit describes that storage object relocation unit's IO frequency, where a high temperature corresponds to a storage object relocation unit with high IO access count and high wear impact to an SSD or other storage device.

The storage object relocation unit temperature calculation algorithm may include: a storage array or other storage system gathering IO statistics for different time intervals and, for each time interval, using the amount of IO that occurred during a previous time interval in conjunction with previous storage object relocation unit temperature values to calculate a new set of storage object relocation unit temperature values (e.g., based on an exponential decay function). The SSD or other storage device wear status calculation algorithm may calculate the wear status based on a combination of factors, such as a worn-out level, IO temperature and capacity usage. W may be used to denote a worn-out level, and represents an SSD's (or other storage device's) accumulated write request count in history data. T may be used to denote IO temperature, and can represent the IO temperature of an SSD (or other storage device) as a sum of the storage object relocation unit IO temperature values of the storage object relocation units of that SSD. C may be used to denote the capacity usage of the SSD (or other storage device). The wear status of an SSD, denoted R, may be computed according to:

$$R = \omega_1 \cdot W + \omega_2 \cdot T + \omega_3 \cdot C$$

where $\omega_1$, $\omega_2$ and $\omega_3$ are weight values, and where $\omega_1 + \omega_2 + \omega_3 = 1$. The bigger the value of R, the more severe the wear degree of the SSD or other storage device.

In order to balance the SSD or other storage device wear in a storage array (or among multiple storage arrays), the storage object relocation units with relatively high temperature values are moved to SSDs or other storage devices with relatively lower wear degrees. In this way, excessive wear of SSDs or other storage devices can be reduced or avoided, and the SSDs or other storage devices wear level usage in a storage array can be balanced.

As discussed above, conventional wear leveling approaches treat each IO as having the same wear impact— such approaches do not take into account differing wear level impacts of different IO patterns. Different applications may run storage workloads having varying IO characteristics. Thus, to analyze and tune performance of a storage system, it is important to understand the types of storage workloads that applications or hosts utilizing the storage system are generating. Storage workloads may be described in terms of various characteristics, including but not limited to IO size, read/write ratio, random/sequential ratio, etc. Different applications, such as a web file server, a web server log, operating system (OS) paging, exchange server, workstation, media streaming, online transaction processing (OLTP) data, and OLTP logging, may have different storage workloads. The web file server application, for example, may have an IO size of 4 kilobytes (KB), 8KB or 64KB, with a read/write ratio of 95% read and 5% write, and a random/sequential ratio of 75% random and 25% sequential. As another example, the OLTP logging application may have an IO size of 512 bytes (B) to 64KB, a read/write ratio of 100% write, and a random/sequential ratio of 100% random. It should be noted that these particular applications and their associated storage workload characteristics are presented by way of example only, and that in other embodiments there may be various other types of applications with different values for their associated storage workload characteristics.

FIGS. 4A-9C show plots which illustrate how different IO patterns have different erase results and impacts for SSDs or other storage devices. The plots of FIGS. 4A-9C were generated in redundant array of independent disks (RAID) groups with RAID1/0 configurations, where each RAID group has three SSD drives of the same drive type. Each RAID group load was made continuous for a period of 100 hours, for a set of six different IO patterns. The data used to generate the plots of FIGS. 4A-9C was generated by recording each SSD's drive erase count number before testing and after 100 hours of writing with each of the six IO patterns. The erase count increasing delta is calculated according to the 100 hours of continuous writing.

Figure 4A:
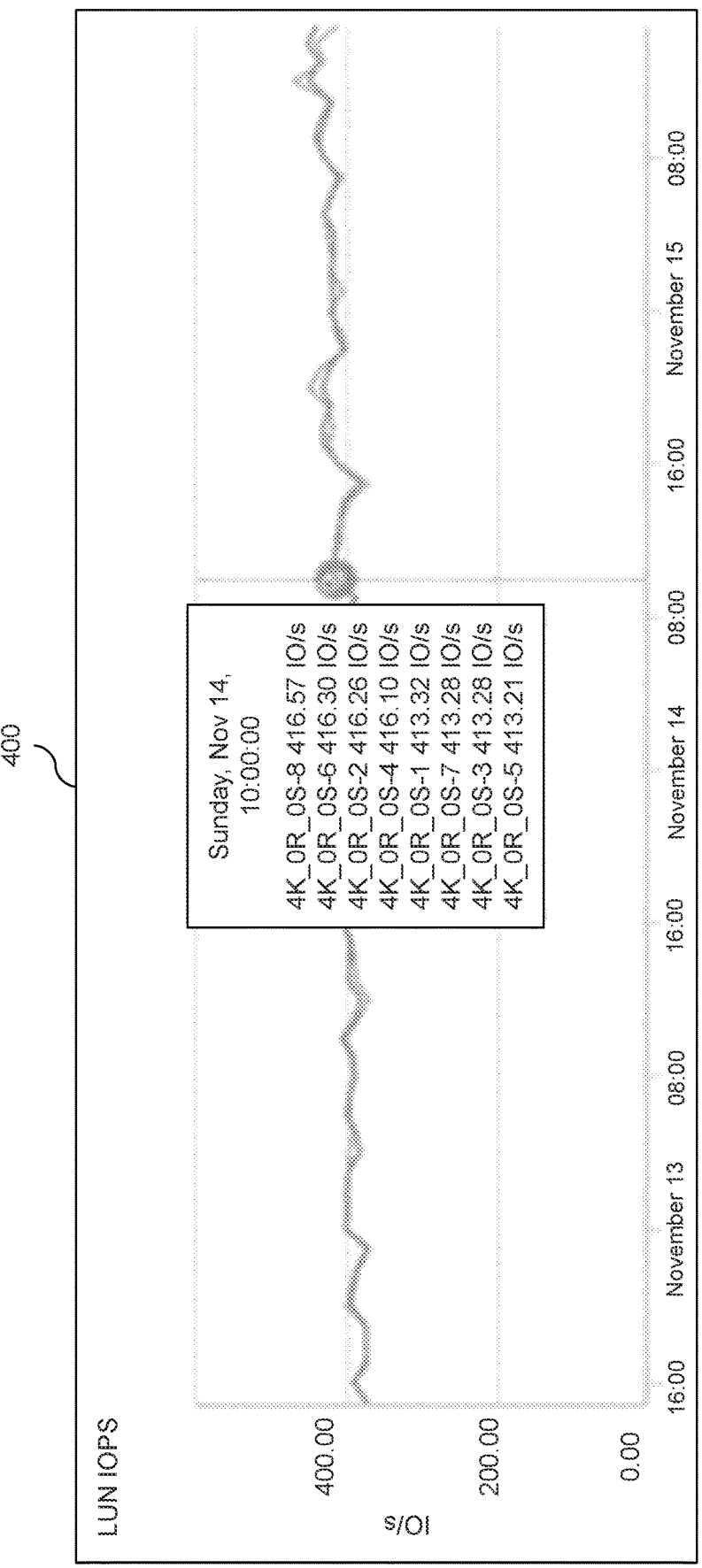
FIGS. 4A-4C show plots of different performance metrics for storage objects with a first input/output pattern stored on different storage tiers in an illustrative embodiment.
Figure 4B:
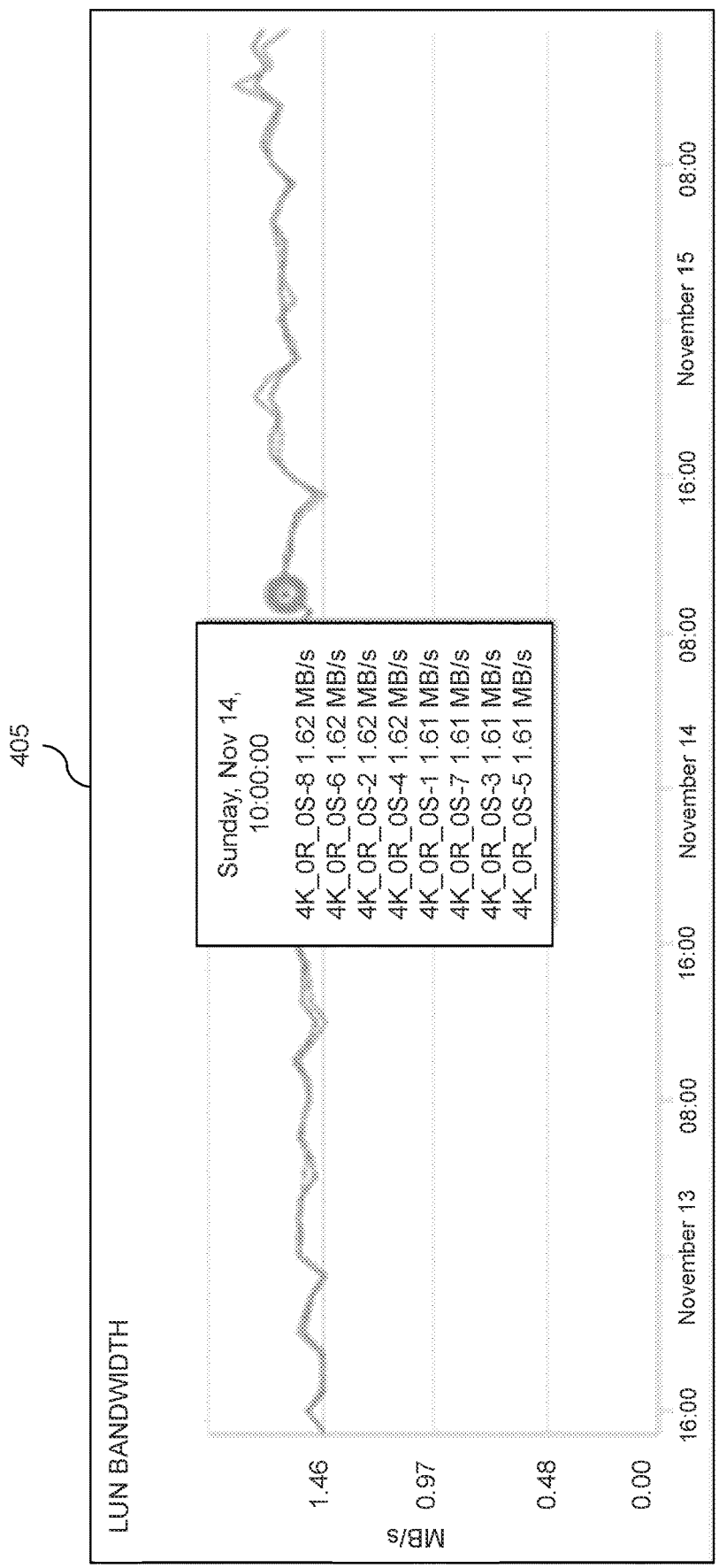
Figure 4C:
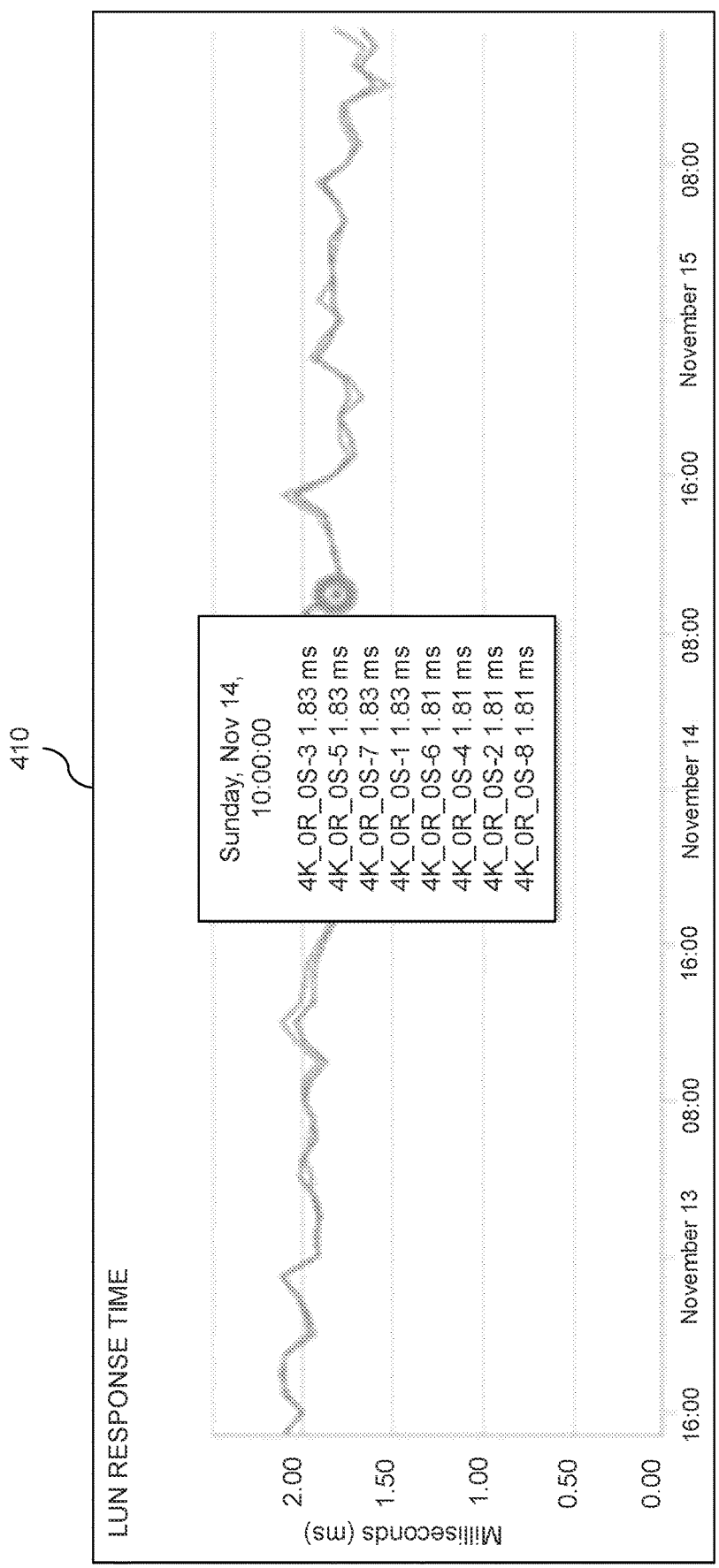
Figure 5A:
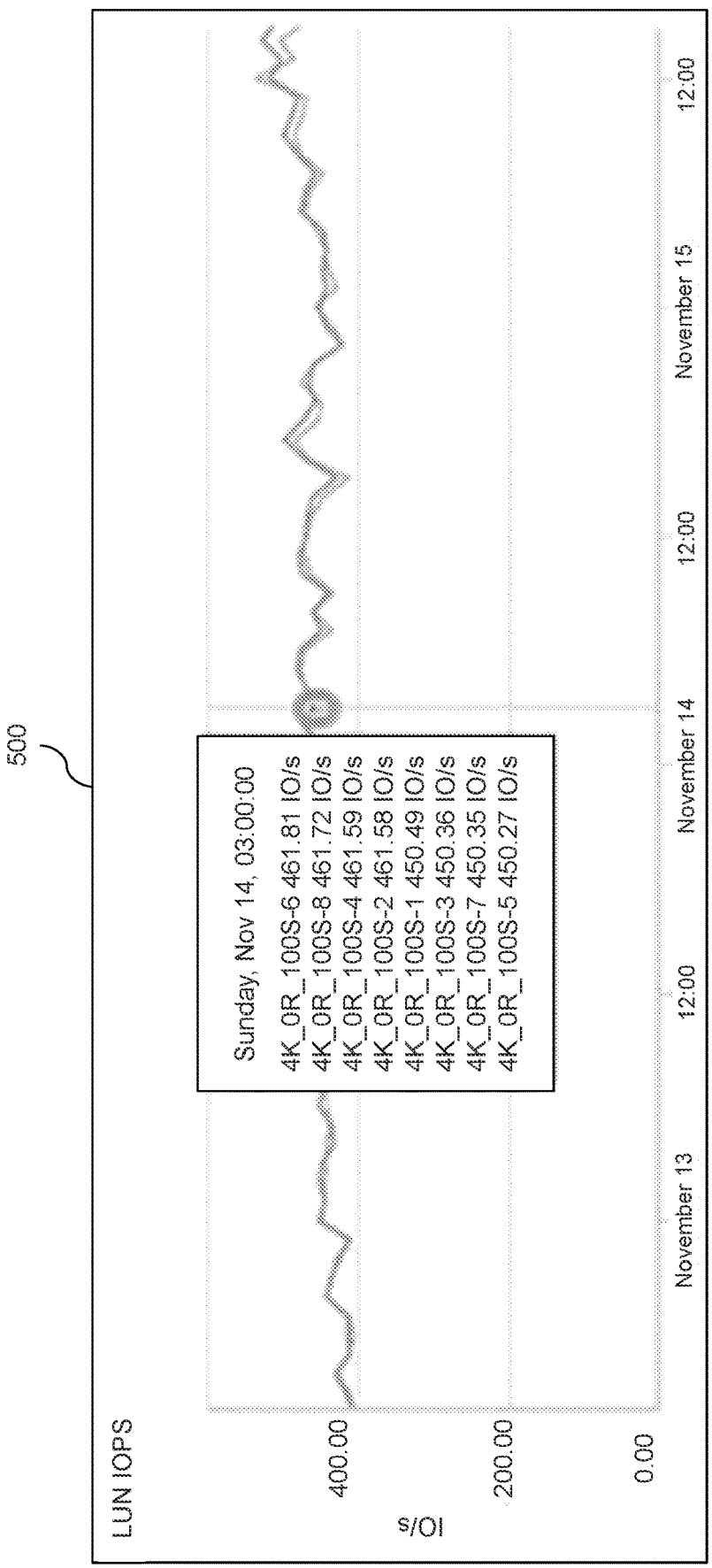
FIGS. 5A-5C show plots of different performance metrics for storage objects with a second input/output pattern stored on different storage tiers in an illustrative embodiment.
Figure 5B:
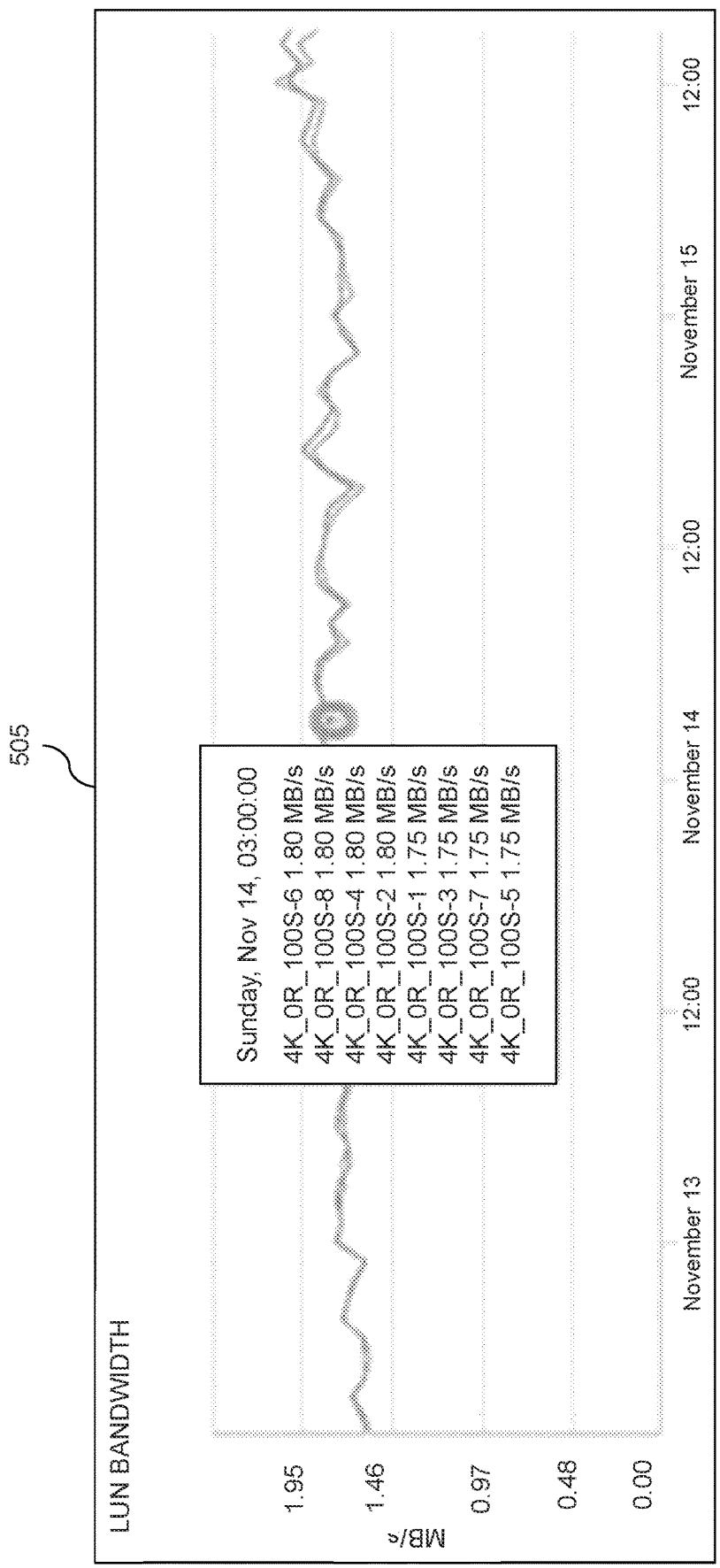
Figure 5C:
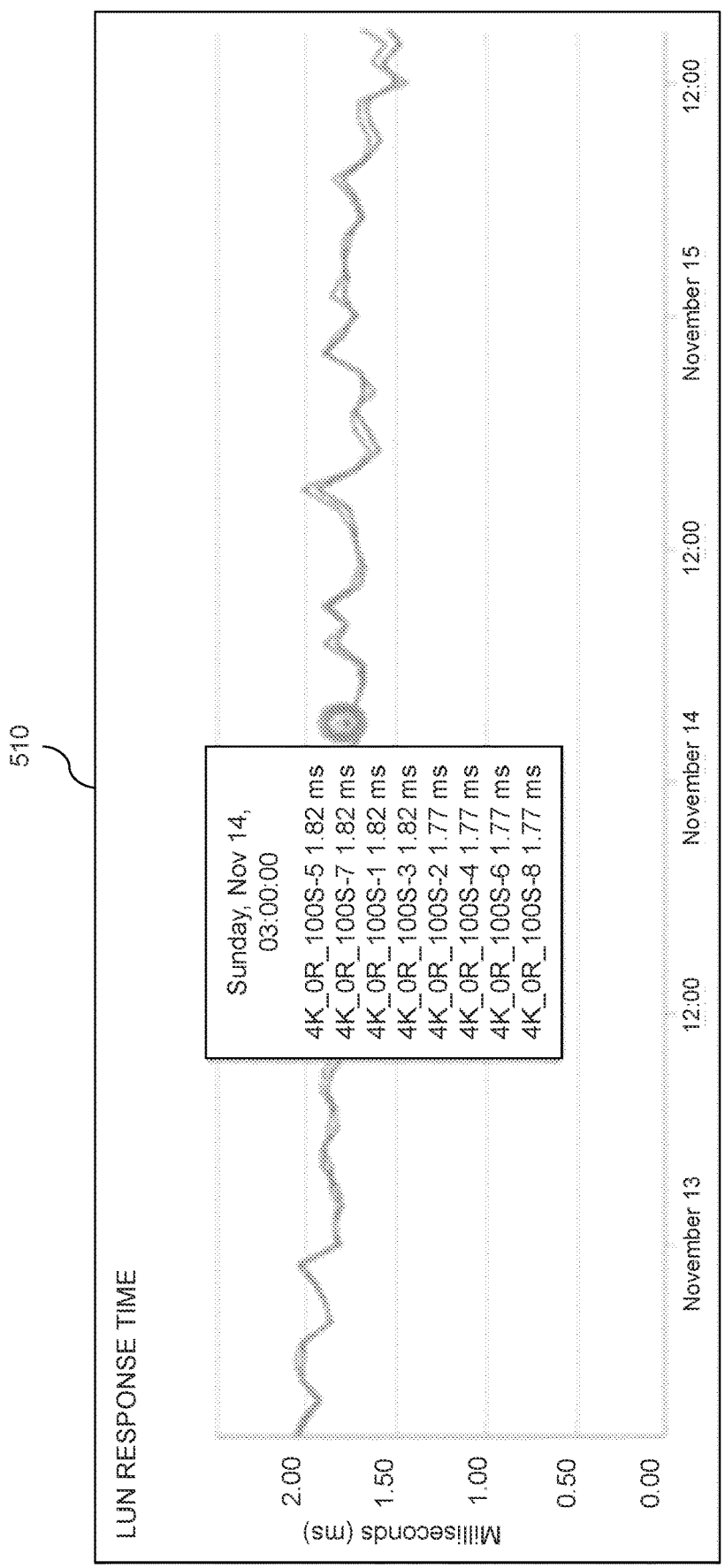
Figure 6A:
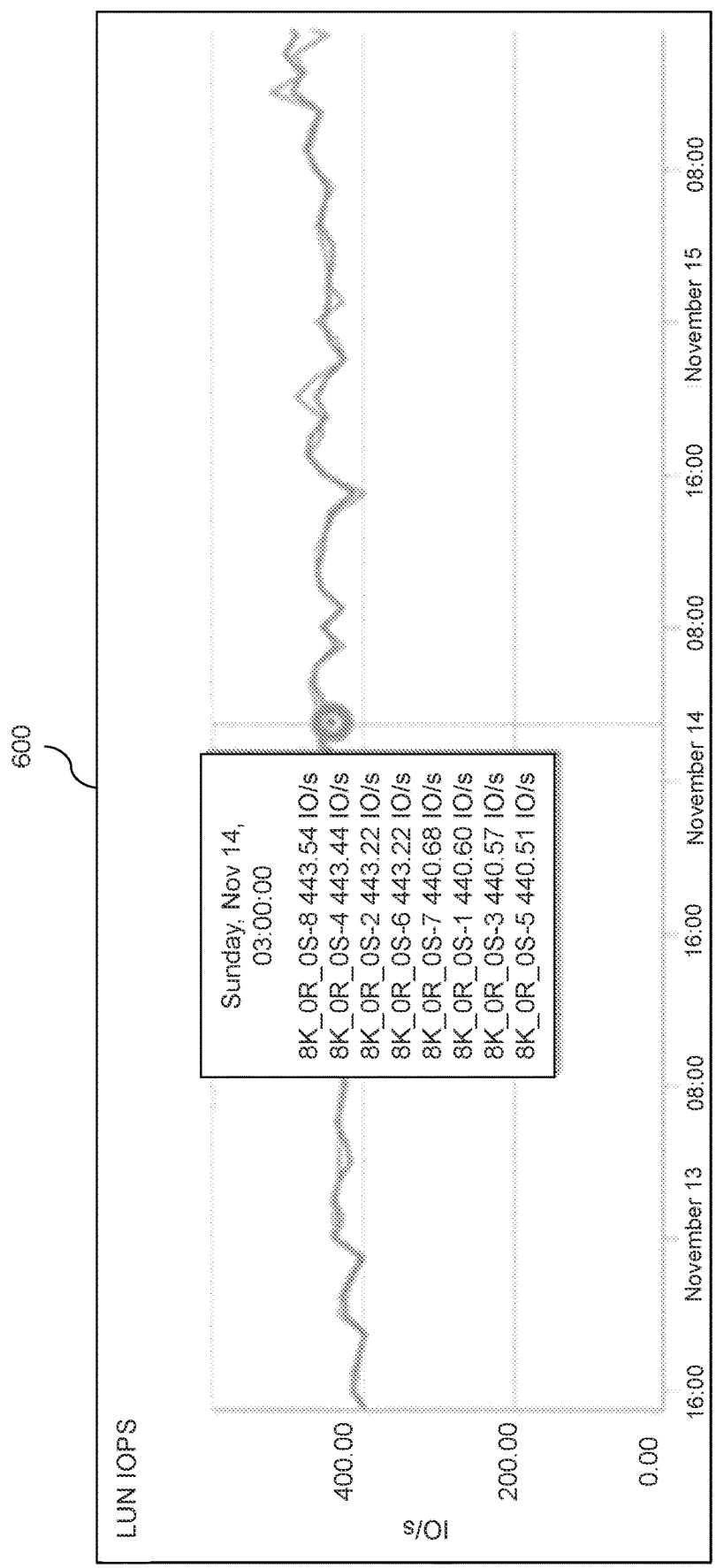
FIGS. 6A-6C show plots of different performance metrics for storage objects with a third input/output pattern stored on different storage tiers in an illustrative embodiment.
Figure 6B:
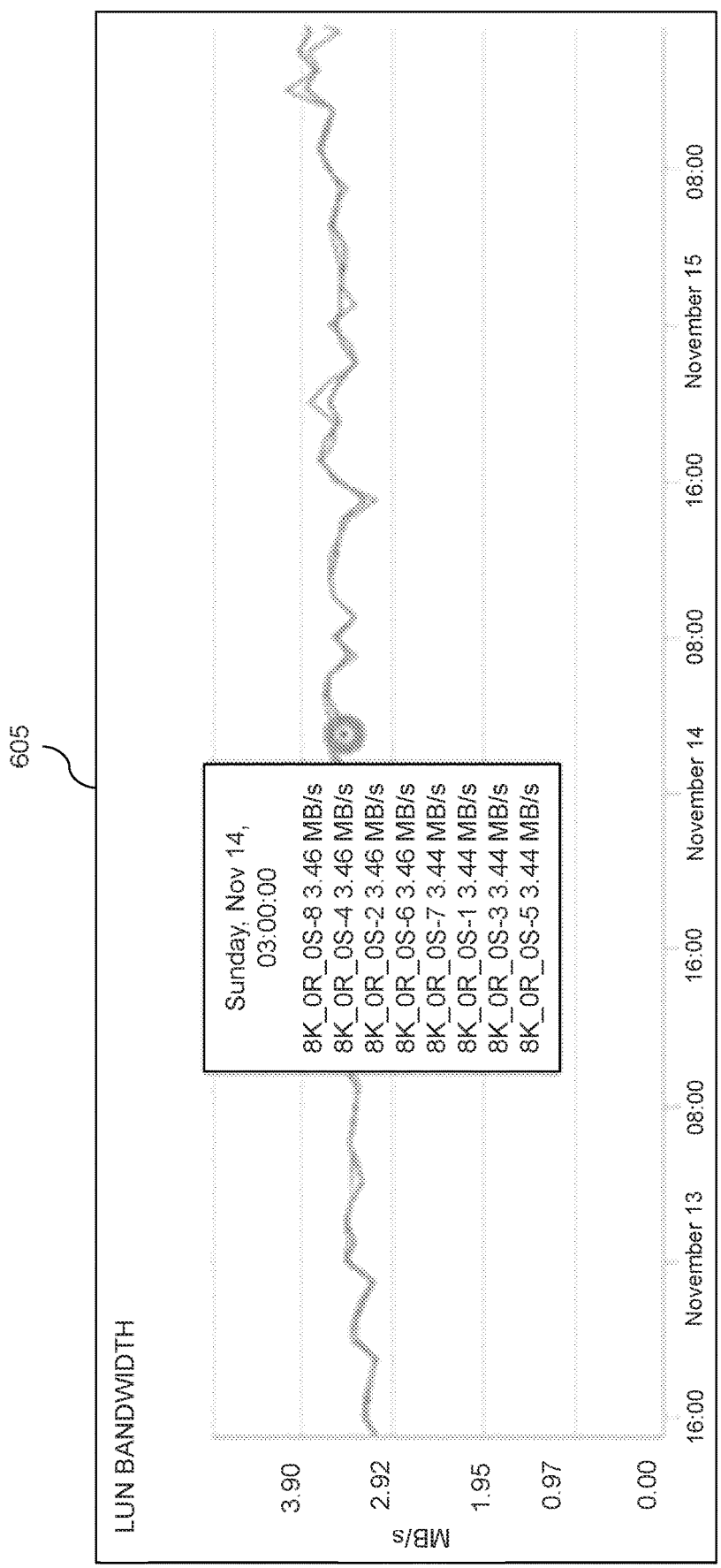
Figure 6C:
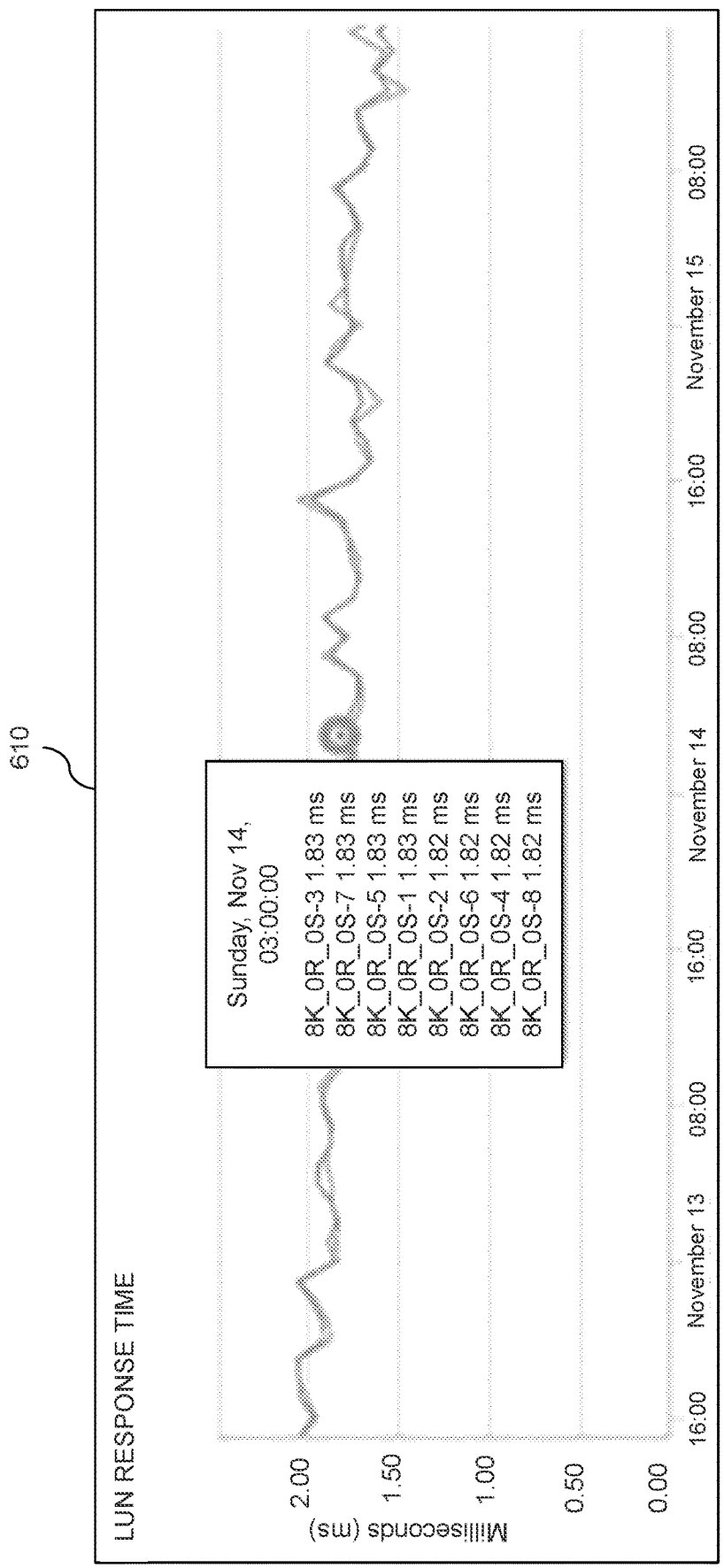
Figure 7A:
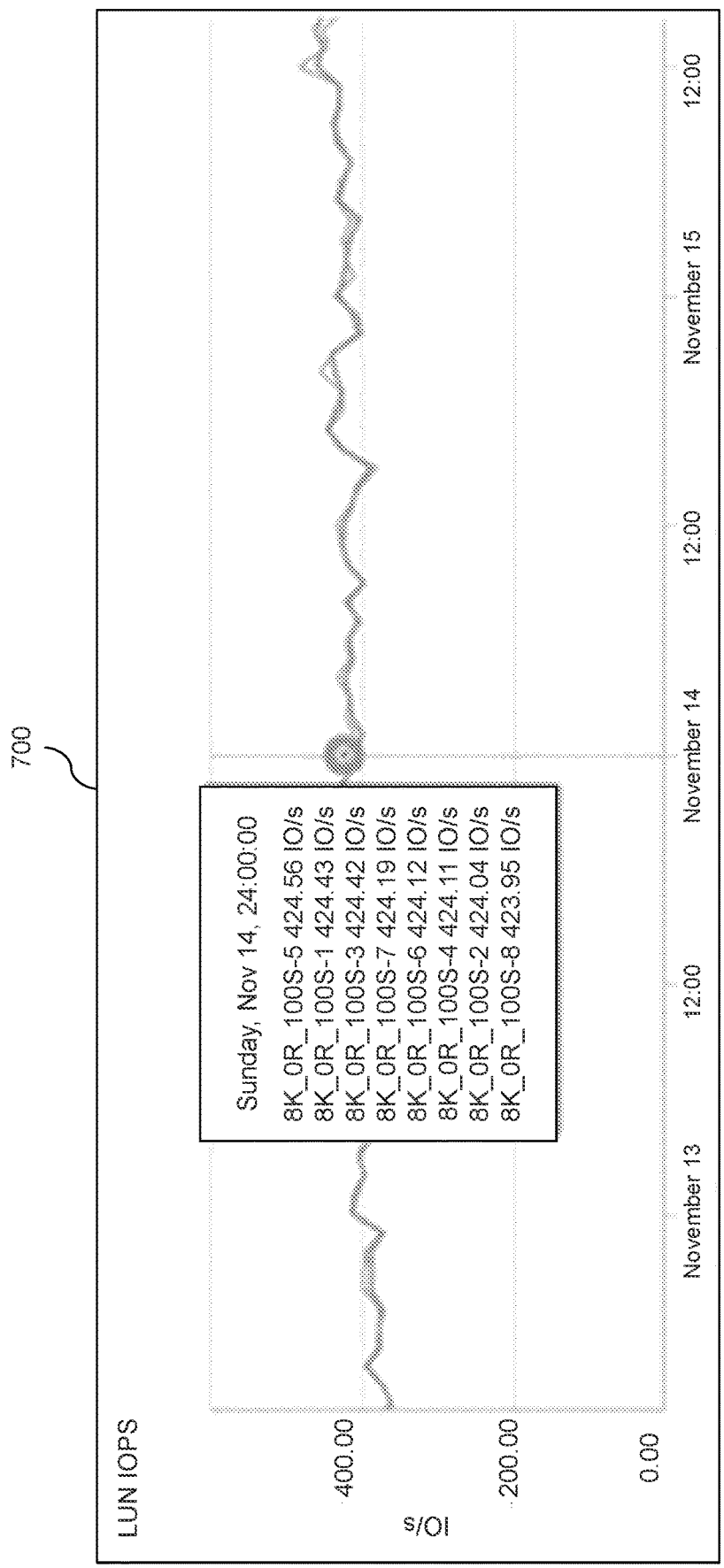
FIGS. 7A-7C show plots of different performance metrics for storage objects with a fourth input/output pattern stored on different storage tiers in an illustrative embodiment.
Figure 7B:
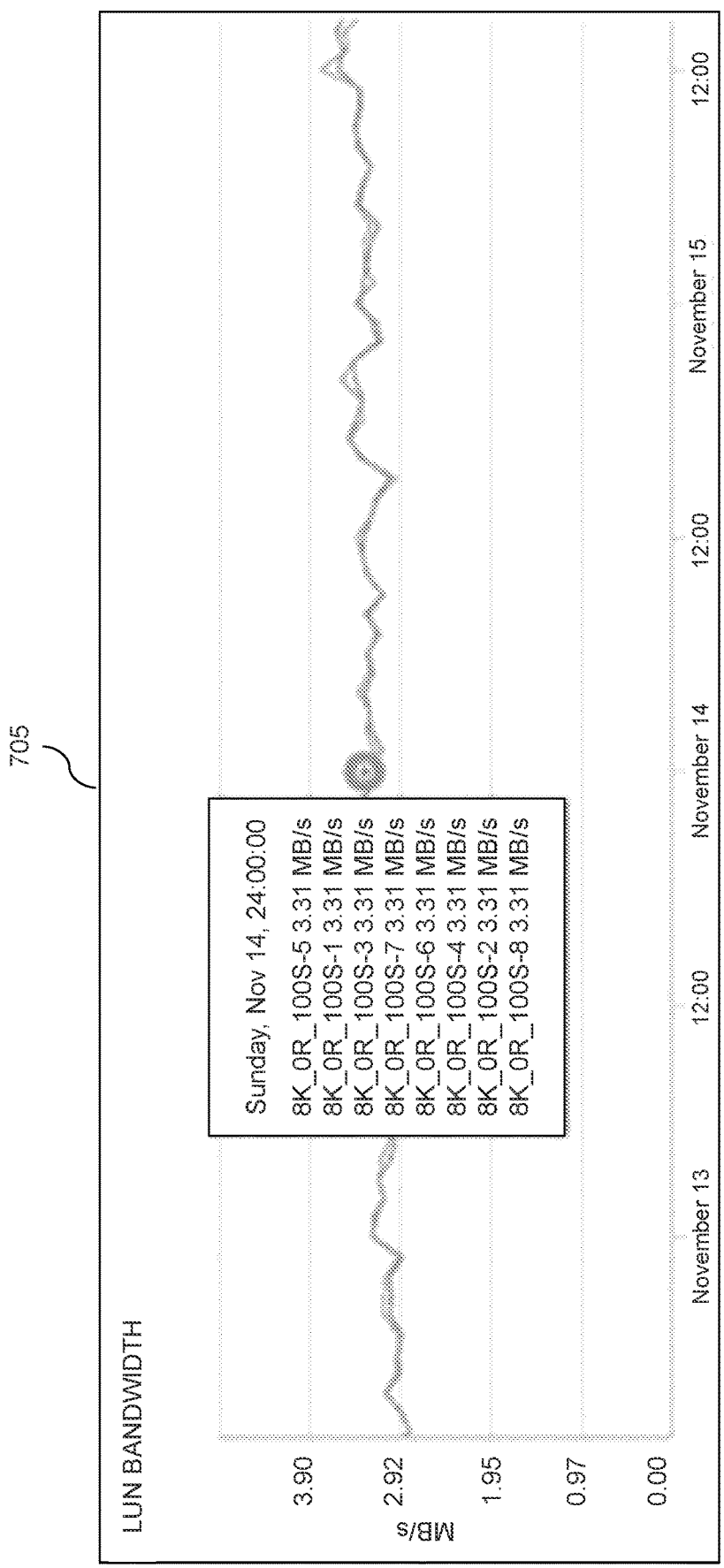
Figure 7C:
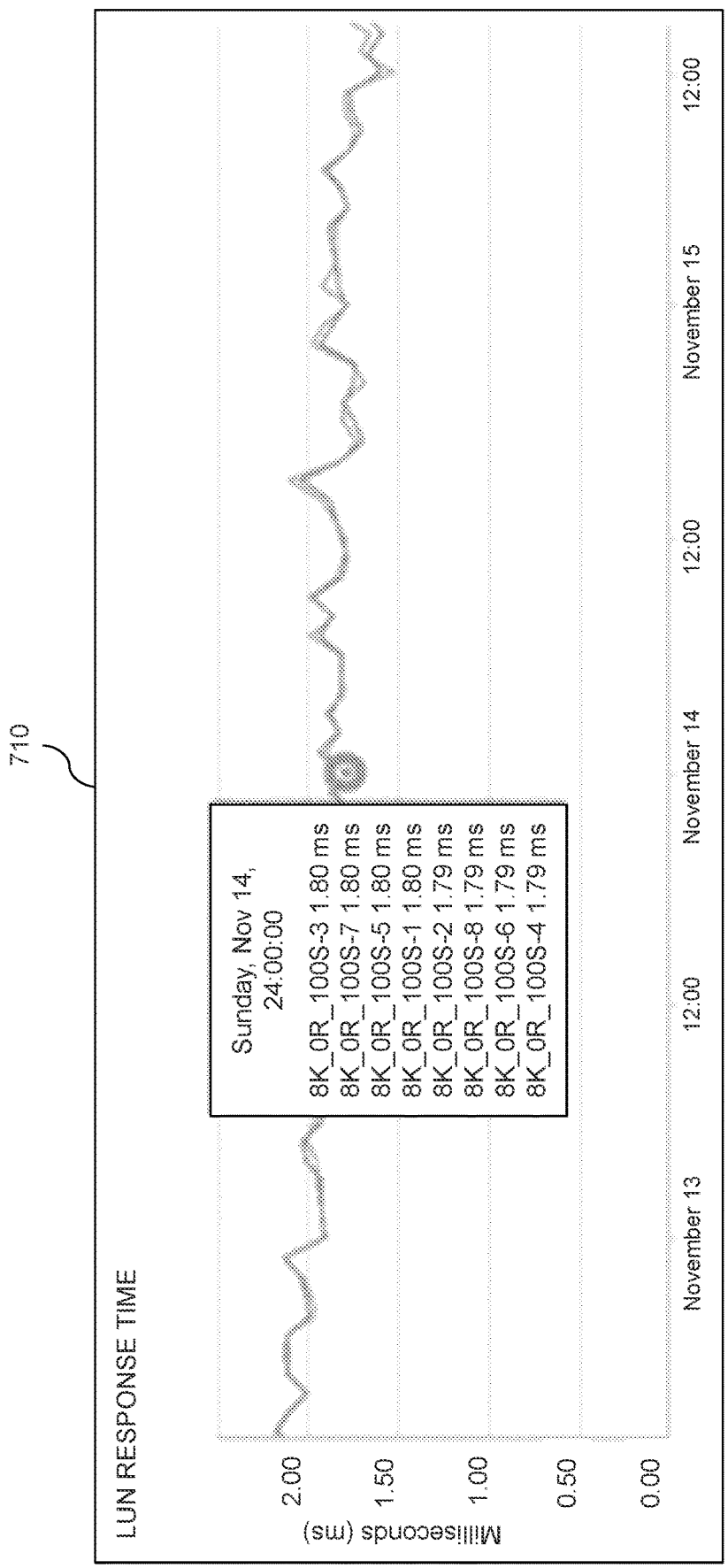
Figure 8A:
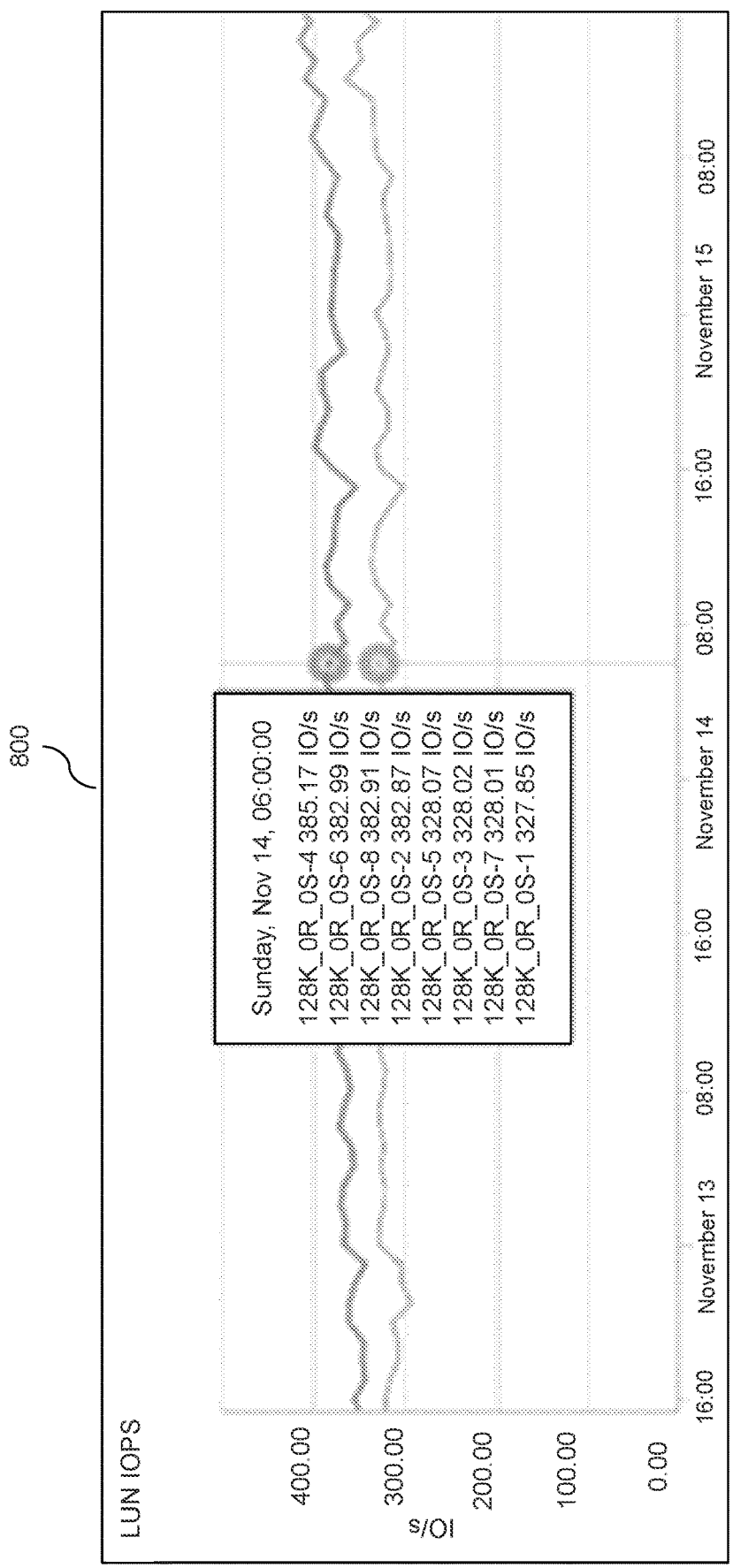
FIGS. 8A-8C show plots of different performance metrics for storage objects with a fifth input/output pattern stored on different storage tiers in an illustrative embodiment.
Figure 8B:
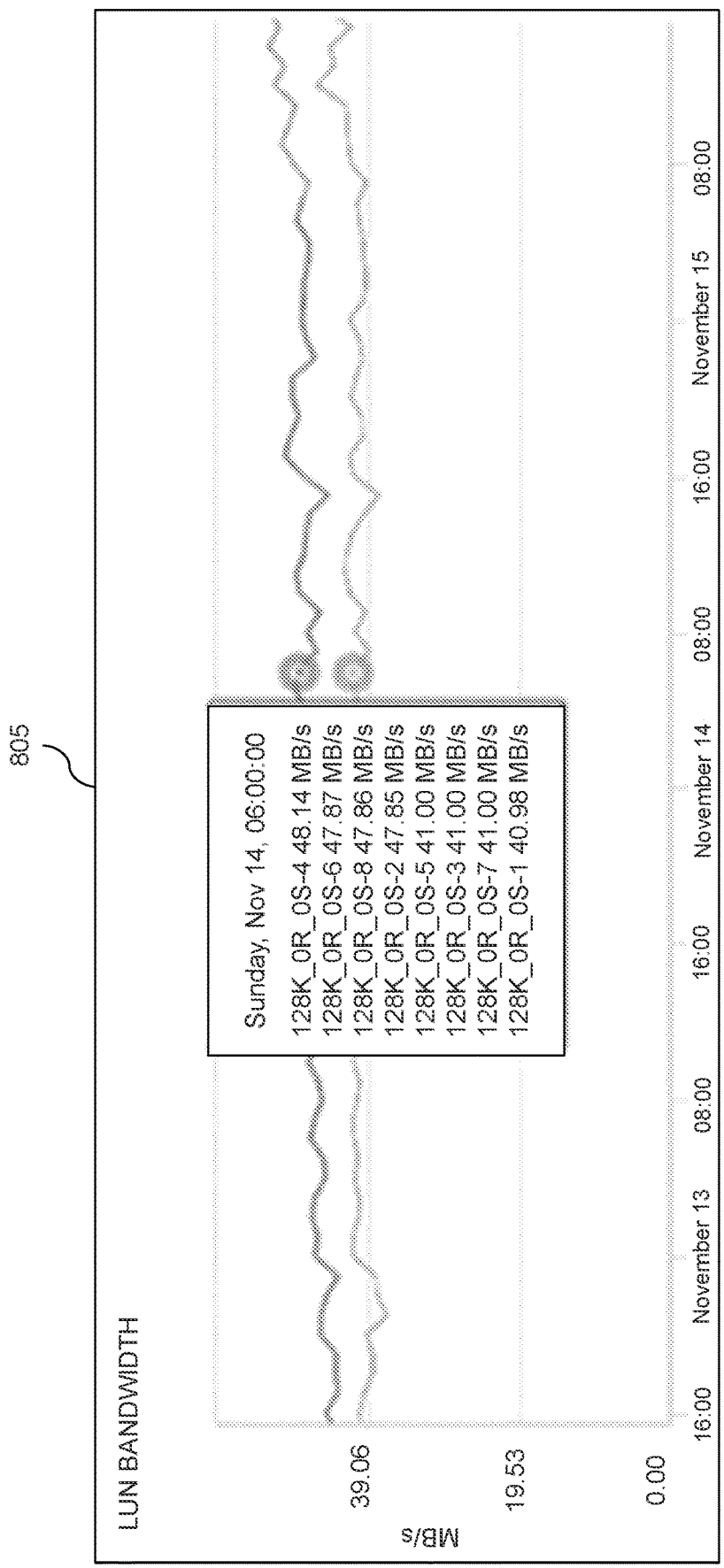
Figure 8C:
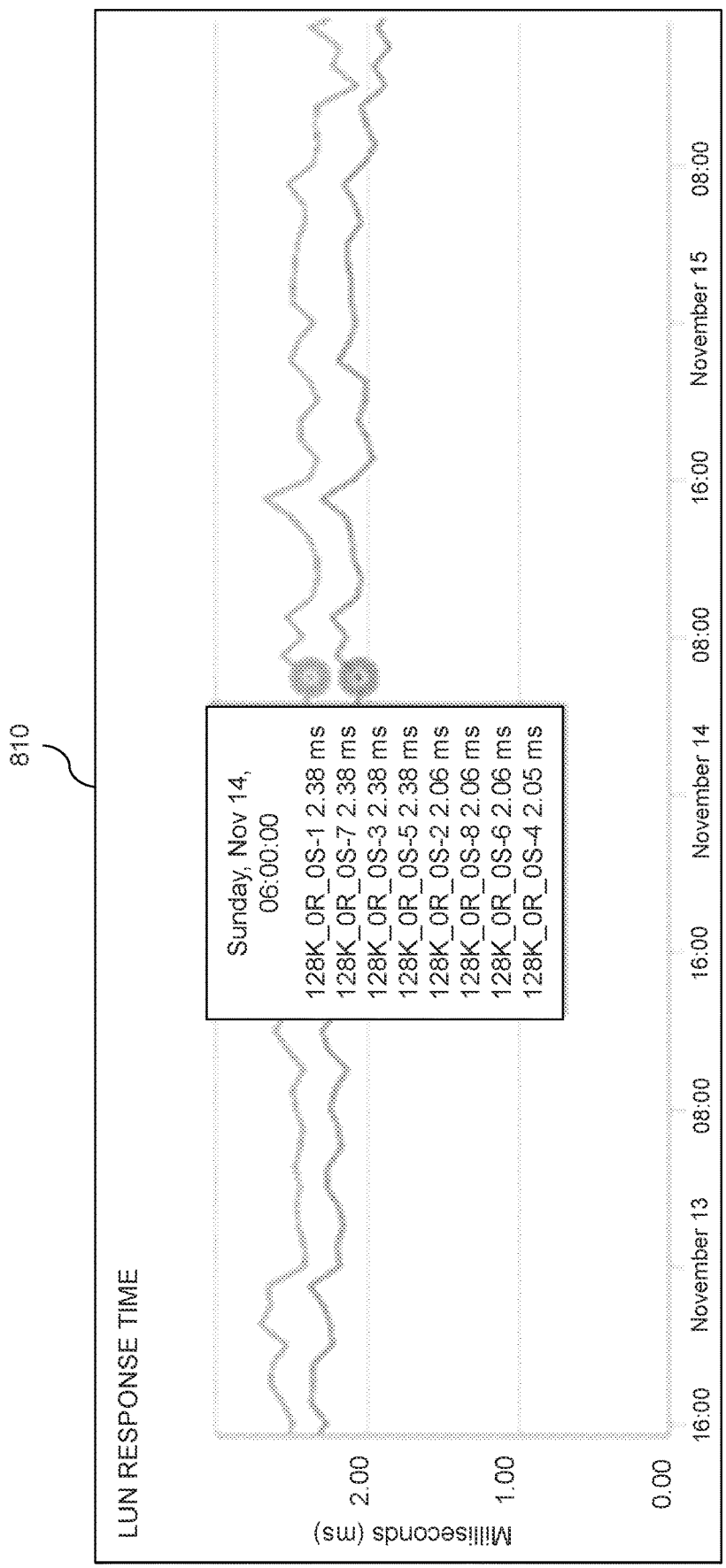
Figure 9A:
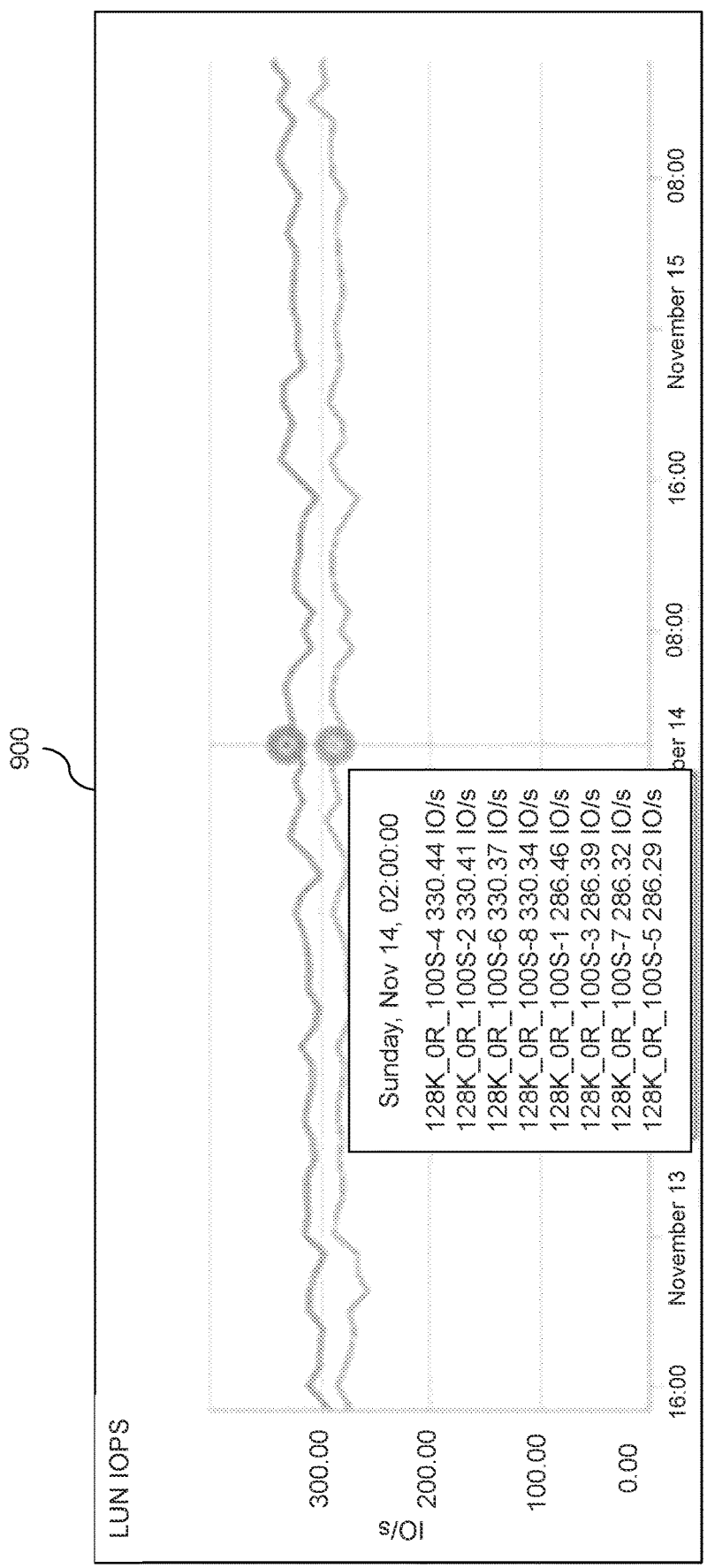
FIGS. 9A-9C show plots of different performance metrics for storage objects with a sixth input/output pattern stored on different storage tiers in an illustrative embodiment.
Figure 9B:
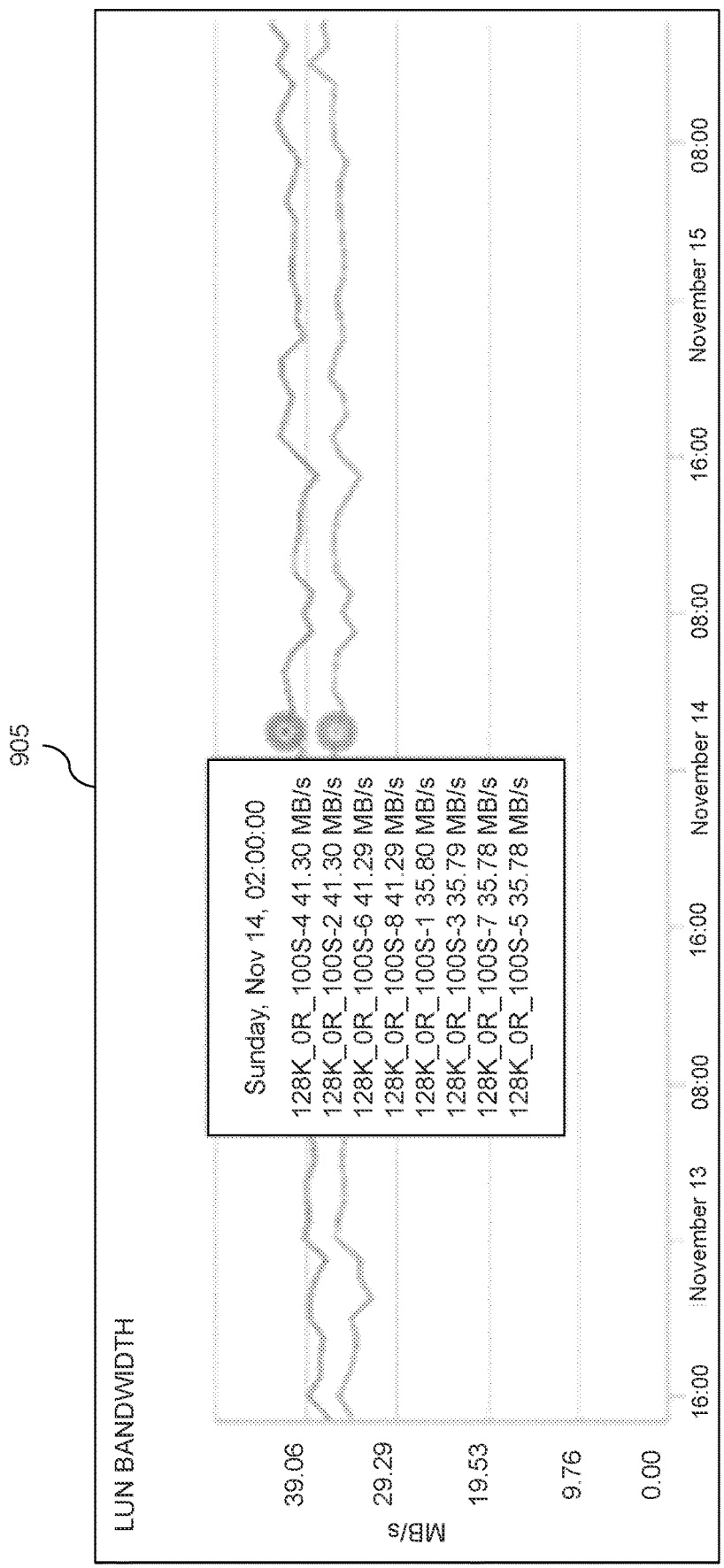
Figure 9C:
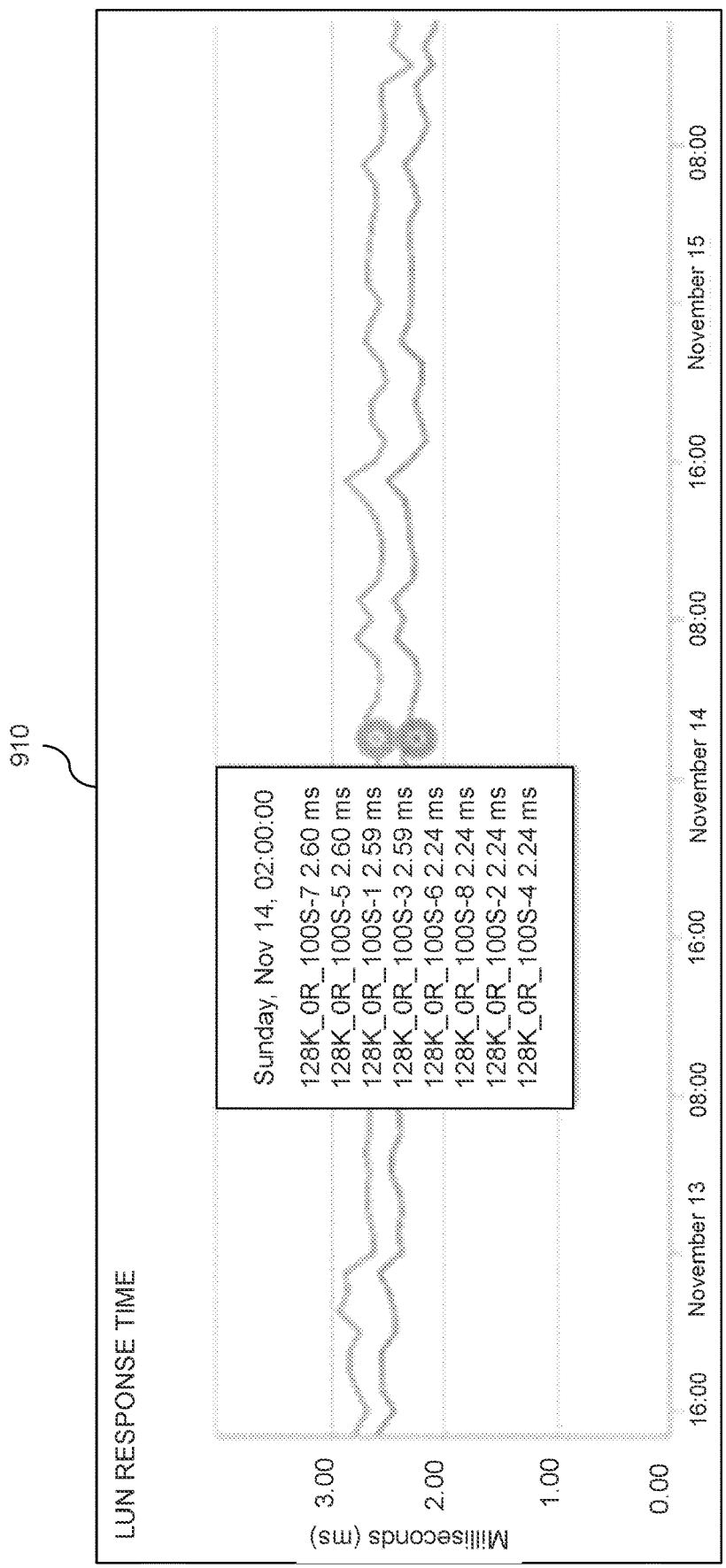

Performance metrics, such as IO operations per second (IOPS), bandwidth and response time, are illustrated in FIGS. 4A-9C for the six different IO patterns:

FIGS. 4A-4C show plots 400, 405 and 410, respectively, for storage objects with a 4KB IO size, a 0%/100% read/write ratio, and a 100%/0% random/sequential ratio (denoted "4K_0R_0S" and also referred to herein as IO pattern P1);

FIGS. 5A-5C show plots 500, 505 and 510, respectively, for storage objects with a 4KB IO size, a 0%/100% read/write ratio, and a 0%/100% random/sequential ratio (denoted "4K_0R_100S" and also referred to herein as IO pattern P2);

FIGS. 6A-6C show plots 600, 605 and 610, respectively, for storage objects with an 8KB IO size, a 0%/100% read/write ratio, and a 100%/0% random/sequential ratio (denoted "8K_0R_0S" and also referred to herein as IO pattern P3);

FIGS. 7A-7C show plots 700, 705 and 710, respectively, for storage objects with an 8KB IO size, a 0%/100% read/write ratio, and a 0%/100% random/sequential ratio (denoted "8K_0R_100S" and also referred to herein as IO pattern P4);

FIGS. 8A-8C show plots 800, 805 and 810, respectively, for storage objects with a 128KB IO size, a 0%/100% read/write ratio, and a 100%/0% random/sequential ratio (denoted "128K_0R_0S" and also referred to herein as IO pattern P5); and FIGS. 9A-9C show plots 900, 905 and 910, respectively, for storage objects with a 128KB IO size, a 0%/100% read/write ratio, and a 0%/100% random/sequential ratio (denoted "128K_0R_100S" and also referred to herein as IO pattern P6).

The plots 400, 500, 600, 700, 800 and 900 of FIGS. 4A, 5A, 6A, 7A, 8A and 9A illustrate LUN IOPS (IO per second (IO/s)) versus time. The plots 405, 505, 605, 705, 805 and 905 of FIGS. 4B, 5B, 6B, 7B, 8B and 9B illustrate LUN bandwidth (megabytes per second (MB/s)) versus time. The plots 410, 510, 610, 710, 810 and 910 of FIGS. 4C, 5C, 6C, 7C, 8C and 9C illustrate LUN response time (milliseconds (ms)) versus time.

Figure 10:
FIG. 10 shows a table summarizing performance metrics for storage objects with the first through sixth input/output patterns stored on different storage tiers in an illustrative embodiment.

After 100 hours of continuous writing of the six IO patterns, each SSD's erase count increase is summarized as shown in table 1000 of FIG. 10. The SSD ID, SSD original erase count (denoted Erase_Count$_{original}$), SSD current erase count (denoted Erase_Count$_{current}$), and writes per second (denoted Writes_per_second) metrics shown in the table 1000 of FIG. 10 may be collected directly from each storage array. The delta erase count after 100 hours (denoted Erase_Count$_{delta}$), total write number in 100 hours (denoted Total_write_number), and average erase count per write (denoted Average_Erase_Count_per_Write) metrics shown in the table 1000 of FIG. 10 can be calculated from the SSD ID, SSD original erase count, SSD current erase count and writes per second metrics according to the following equations:

Erase_Count$_{delta}$=Erase_Count$_{current}$−Erase_Count$_{original}$

Total_write_number=Writes_per_second*60*60*100

Average_Erase_Count_per_Write=Erase_Count$_{delta}$/Total_write_number

From the table 1000, it can be seen that the different IO patterns have different erase impacts for the SSD drives. Generally, the IO patterns with bigger IO size have a higher erase impact and, for IO patterns with the same size, random write patterns have a higher erase impact the sequential write patterns.

If wear leveling mechanisms do not consider IO pattern differences, this can lead to inaccuracies in storage object relocation unit temperature calculations and SSD or other storage device wear status calculations. Inaccuracies in such calculations can further lead to inaccuracy in storage object relocation and wear leveling guides. For example, in storage object relocation unit temperature calculation, assume there are two IO patterns (A=4K_0R_100S, B=128K_0R_100S) on a given storage object relocation unit. A conventional approach would treat each 10 pattern as having the same wear impact to SSDs or other storage devices, and can calculate the storage object relocation unit's temperature as 2. The wear impact of IO pattern B, however, is about three times that of IO pattern A. Thus, using the techniques described herein the storage object relocation unit's temperature should be 4. The SSD or other storage device wear status calculations have similar issues as they are based on the storage object relocation unit temperatures and the accumulated writes of the storage object relocation units on each SSD or other storage device. FIG. 11 shows a table 1100 illustrating wear leveling problems for a storage pool include a set of fourteen SAS flash type drives each with a capacity of 733.5 GB. The table 1100 illustrates the estimated end of life (EOL) in days following six months usage of the storage pool. As illustrated, the maximum EOL difference is 45 days after six months usage.

As discussed above, conventional wear leveling approaches in storage arrays treat each IO as the same. Illustrative embodiments provide approaches for improved wear leveling in storage arrays (and potentially across storage arrays) through consideration of IO pattern wear impact factors while calculating storage object relocation unit temperature and SSD or other storage device wear status, and in generating storage object relocation guides to perform wear leveling. In order to improve the accuracy of wear leveling, illustrative embodiments consider IO patterns in algorithms for calculating IO pattern wear scores which can represent each IO pattern's wear impact to SSDs or other storage devices. The IO pattern wear scores are leveraged in storage object relocation unit temperature and SSD or other storage device wear status calculations to generate a relocation guide for wear leveling.

Figure 12:
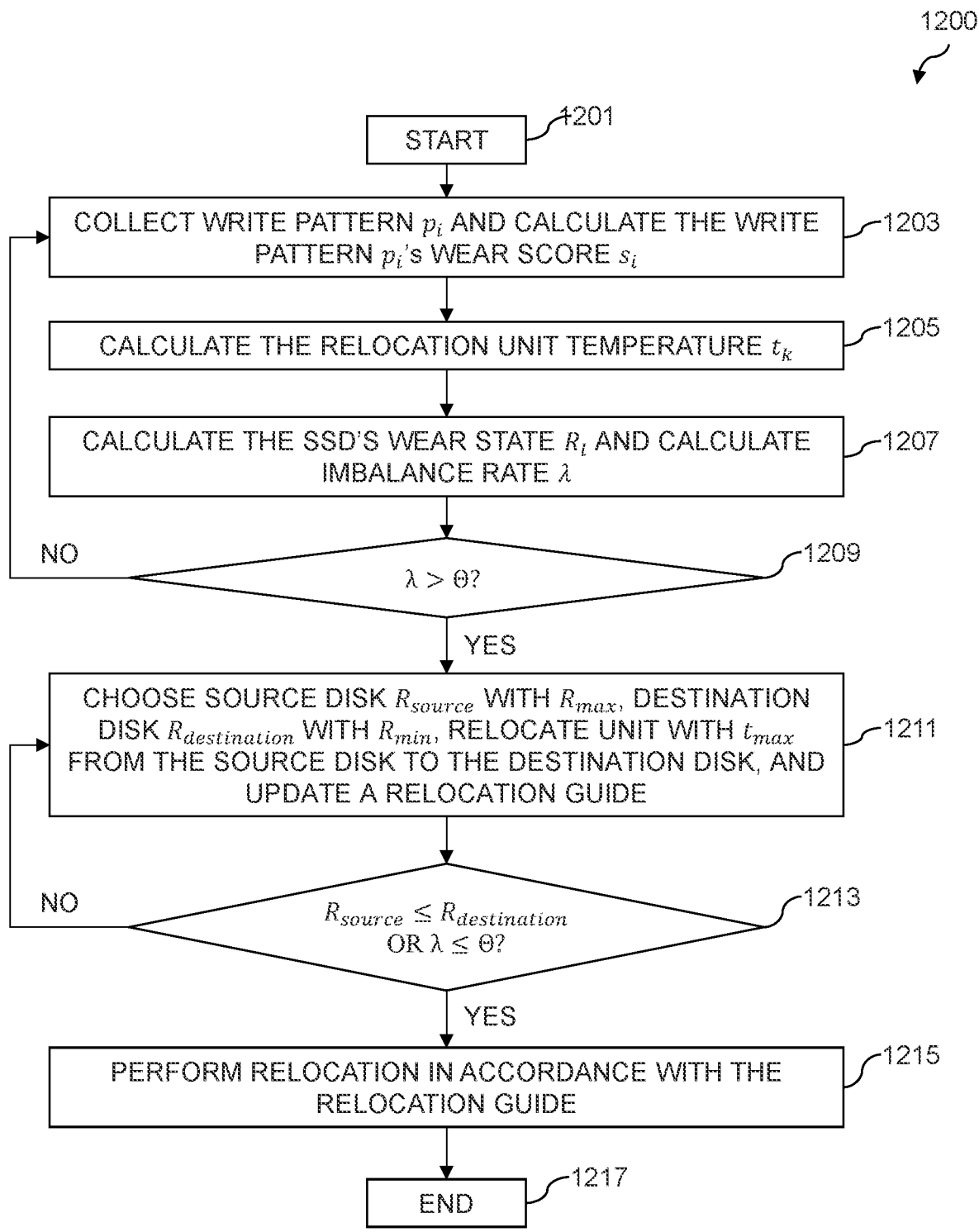
FIG. 12 shows a process flow for storage object relocation taking into account input/output pattern wear levels of storage objects in an illustrative embodiment.
Figure 13:
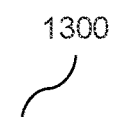
FIG. 13 shows a table illustrating wear status of storage drives in a storage array in an illustrative embodiment.
Figure 14:
FIG. 14 shows a table illustrating input/output pattern wear levels of storage objects stored on storage drives in a storage array before relocation in an illustrative embodiment.

FIG. 12 shows a process flow 1200 for storage object relocation which takes into account IO pattern wear scores. The process flow 1200 starts 1201 (e.g., in accordance with a schedule, in response to an explicit user request or some other condition), and in step 1203 IO patterns (e.g., write patterns) are collected and used to calculate IO pattern wear scores. In some embodiments, the different IO patterns' wear impact to SSDs or other storage devices is calculated utilizing a statistical average method. Write counts and delta erase count increases of SSDs or other storage devices are collected for a time period T. The number of IO patterns is denoted N, with each IO pattern being represented as $p_i$, where 1≤i≤N. The total write number of $p_i$ is $M_i$, and $M_i$ writes leads to an SSD or other storage device's erase count increasing number $e_i$ in period T. The average erase count per write is then calculated according to:

$$c_i = \frac{e_i}{M_i}$$

Assume the total number of SSDs or other storage devices is B, and then the average erase count per IO write of $p_i$ is calculated according to:

$$Avg_{c_i} = \frac{\sum_{b=1}^{B} c_i}{B} = \frac{\sum_{b=1}^{B} \frac{e_i}{M_i}}{B}$$

The average erase count per IO write of all IO patterns is calculated according to:

$$Avg_e = \frac{\sum_{i=1}^{N} Avg_{c_i}}{N}$$

Finally, the relative erase score of IO pattern $pi_i$ in all IO patterns can be calculated according to:

$$s_i = \frac{Avg_{c_i}}{Avg_e}$$

It should be appreciated that the above IO pattern calculations can be done on or off the storage array. For example, in some cases it is desired to save the computing resources of a storage array, and the most common IO patterns can be summarized, tested and analyzed to get the IO patterns' erase degree. The classification of IO pattern types of storage objects may then be performed on the storage array. To increase the accuracy of the IO pattern erase degree results, step 1203 (e.g., collecting and analyzing the IO patterns in each period T) can be performed on the storage array.

In step 1205, the storage object relocation unit temperatures $t_k$ of storage objects are calculated. An end-user may create various storage objects (e.g., LUNs, filesystems, virtual volumes) for specific business usage. It should be noted that a storage object may contain a single relocation unit, or multiple relocation units. The storage objects are used for specific applications. Some storage objects may have stable IO patterns, while other storage objects may have random or non-stable IO patterns. Each storage object may thus be classified into one of two types: those whose IO patterns are not stable and change irregularly; and those whose IO patterns are stable. Storage objects without stable IO patterns may be treated using algorithms that do not consider wear impacts (e.g., the erase score for non-stable storage objects may be represented as the storage object's IO access frequency: t=f). The number of storage objects with stable IO patterns (e.g., corresponding to one of the IO patterns $p_i$) is denoted K, and in a storage object the relocation unit $o_k$ with write pattern $p_i$, $f_k$ is the IO frequency of the relocation unit $o_k$, which can be combined with the IO pattern's erase score $s_i$ to calculate the relocation unit $o_k$'s temperature according to the following equation:

$$t_k = s_i \cdot f_k$$

Storage object relocation units with bigger scores have higher erase impact on SSDs and other storage devices, and storage object relocation units with lower scores have lower erase impact on SSDs and other storage devices.

The SSD or other storage device wear status and imbalance rate are calculated in step 1207. In a storage array with L SSDs or other storage devices, for each disk l (1≤l≤L), the wear status in the storage array can be calculated by combining multiple factors, including a worn-out level, IO temperature, and capacity usage:

$$W_{Diskl} = \sum_{k=1}^{K} W_{l,o_k}$$

$$T_{Diskl} = \sum_{k=1}^{K} t_{l,o_k} = \sum_{k=1}^{K} s_i \cdot f_{l,o_k}$$

$$C_{Diskl} = \sum_{k=1}^{K} C_{l,o_k}$$

The disk l's relative wear status in the storage array can be calculated according to the following equation:

$$R_l = \omega_r \cdot \frac{W_{Diskl}}{\sum_{l=1}^{L} W_{Diskl}} + \omega_t \cdot \frac{T_{Diskl}}{\sum_{l=1}^{L} T_{Diskl}} + \omega_c \cdot \frac{C_{Diskl}}{\sum_{l=1}^{L} C_{Diskl}}$$

The bigger the value of $R_l$, the more worn the disk l is. High temperature storage object relocation units should be moved to disks with smaller values of R. In this way, the wear status in the storage array can be balanced.

The imbalance rate of the storage array is evaluated to decide if wear balancing should be performed. The average wear status of the SSDs or other storage devices in the storage array is calculated according to:

$$R_{average} = \frac{\sum_{l=1}^{L} R_l}{L}$$

The standard deviation of the wear status of the SSDs or other storage devices in the storage array is:

$$\sigma = \sqrt{\frac{\sum_{l=1}^{L}(R_l - R_{average})^2}{L}}$$

The imbalance rate in the storage array can be calculated according to the following equation:

$$\lambda = \frac{\sigma}{R_{average}} = \frac{\sqrt{\frac{\sum_{l=1}^{L}(R_l - R_{average})^2}{L}}}{R_{average}}$$

An imbalance threshold denoted Θ is specified (e.g., by an end-user or operator of the storage array). In step 1209, a determination is made as to whether λ>Θ. If the result of the step 1209 determination is no, the process flow 1200 returns to step 1203. If the result of the step 1209 determination is yes, this corresponds to the storage array's SSD or other storage device wear status being too imbalanced such that storage object relocation for wear level balancing is initiated in step 1211.

In step 1211, a relocation guide for storage array wear leveling is generated. The SSD or other storage device with maximum value $R_{max}$ is the most worn, and is set as the source disk denoted $R_{source}$. The SSD or other storage device with minimum value $R_{min}$ is the least worn, and is set as the destination disk denoted $R_{dest}$. The storage object relocation unit on the source disk with the maximum erase score $s_{max}$ is the best choice for relocation, as moving that storage object relocation unit has the lowest migration cost and gets the most wear balancing results. After each (or after some designated threshold number of storage object relocation units being moved from the currently selected source disk to the currently selected destination disk), a determination is made in step 1213 as to whether $R_{source} \leq R_{dest}$ or λ≤Θ. If the result of the step 1213 determination is no, the process flow 1200 returns to step 1211. If the result of the step 1213 determination is yes (e.g., the rebalancing algorithm can be stopped until the next scheduled rebalancing), the process flow 1200 proceeds to step 1215. In step 1215, the relocation guide is executed. The process flow 1200 then ends 1217.

Figure 16A:
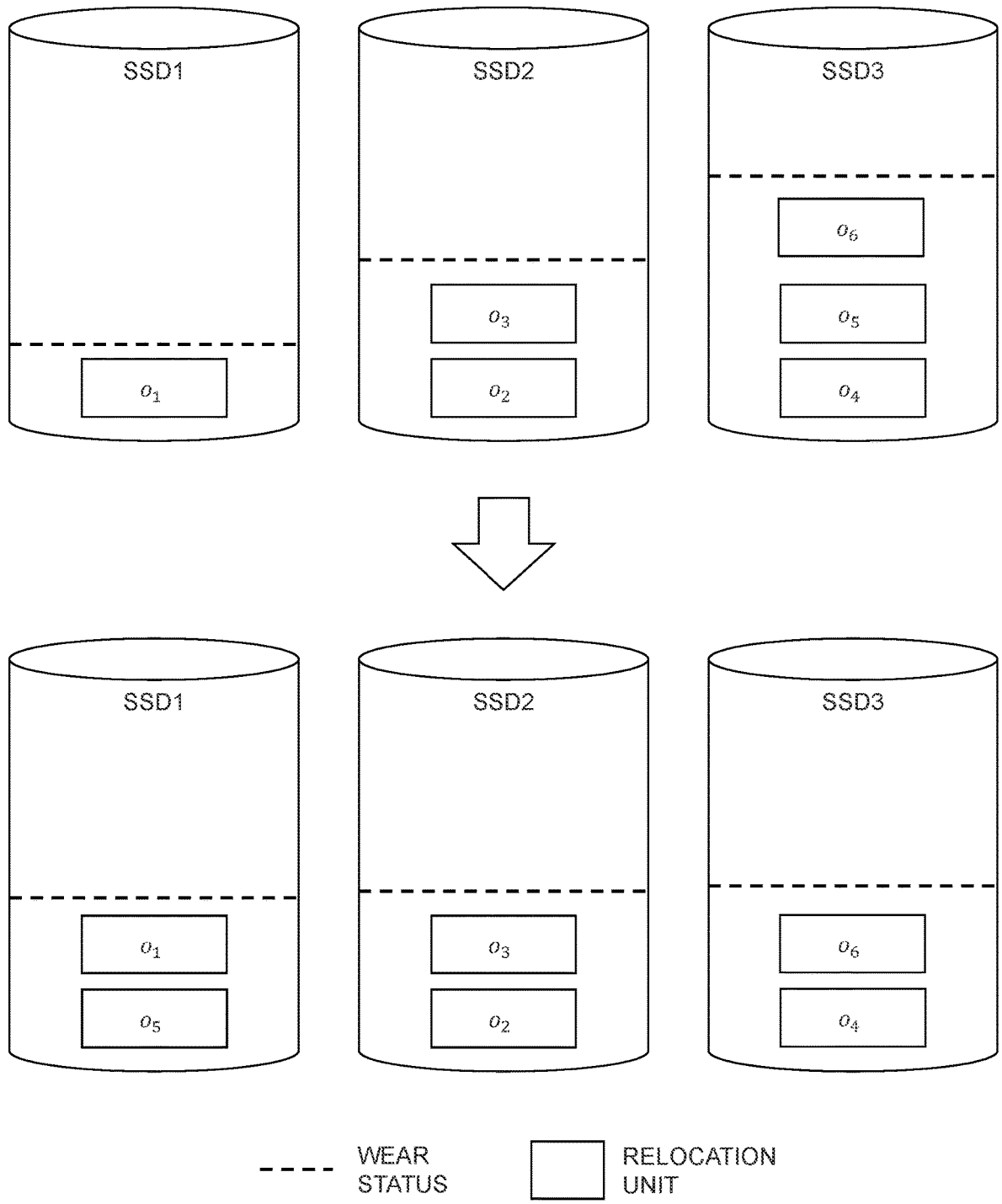
FIGS. 16A and 16B show examples of storage object relocation which does and does not take into account input/output pattern wear levels of storage objects in an illustrative embodiment.
Figure 16B:
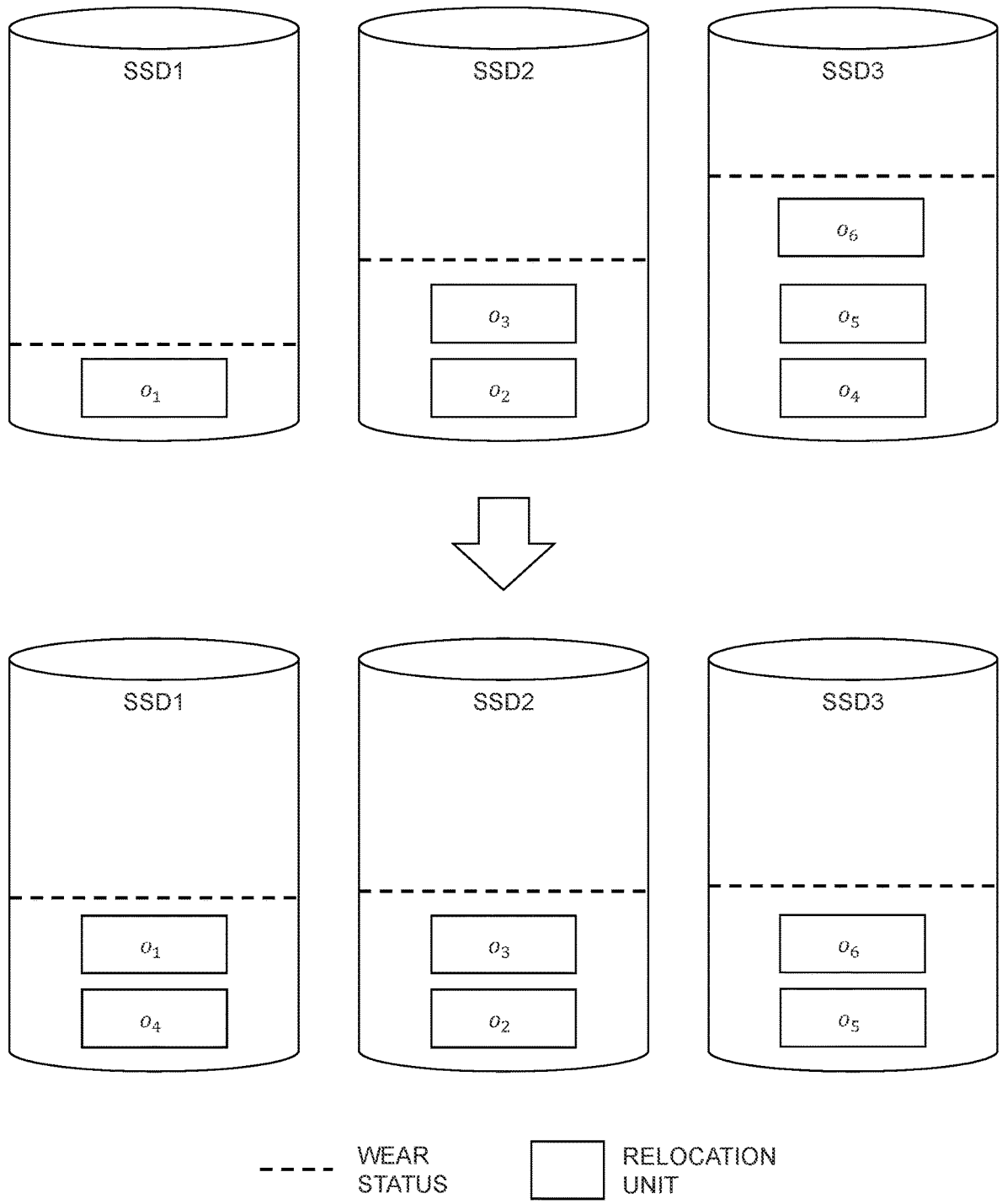

An example implementation of the process flow 1200 of FIG. 12 will now be described with respect to FIGS. 13-16B. In this example, a storage array is assumed to comprise three SSDs (L=3), the imbalance rate threshold is set as Θ=20%, and the weight values are set as $\omega_c$=30%, $\omega_T$=40% and $\omega_W$=30%. The initial capacity usage, IO temperature and wear status values are shown in the table 1300 of FIG. 13. Using the equations described above, the write pattern wear score $s_i$, storage object relocation unit IO temperature $t_k$, disk wear status $R_l$ and storage array wear imbalance rate λ are determined as shown in the table 1400 of FIG. 14. From these results, it is determined that the SSD3 has the most wear and the SSD1 has the least wear, and that the imbalance rate of the storage array λ=0.716447724. As the storage array's imbalance rate is bigger than the threshold Θ=20%, rebalancing is initiated in the storage array. In a conventional approach for wear leveling, the storage object relocation unit os has the highest temperature, and the conventional approach for wear leveling will relocate os from SSD3 to SSD1. Using the techniques described herein which take into account the IO patterns of the storage object relocation units, the storage object relocation unit $o_4$ (e.g., which has the highest erase impact on SSDs) is relocated from SSD3 to SSD1 to prevent or mitigate wear out of SSD3. FIG. 15 shows a table 1500 illustrating the storage array wear status following relocation of the storage object relocation unit $o_4$ from SSD3 to SSD1. As illustrated, $\lambda=0.19<\Theta$, and the current iteration of wear level balancing can be stopped until a next scheduled wear leveling determination. FIG. 16A shows wear leveling using a conventional approach (e.g., which does not take into account the IO pattern's wear impact). FIG. 16B shows wear leveling using the techniques described herein which take into account the IO pattern's wear impact.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for wear leveling between storage devices of a storage system based at least in part on IO patterns of storage objects will now be described in greater detail with reference to FIGS. 17 and 18. Although described in the context of system 100, these platforms may also be used to implement at least portions of other information processing systems in other embodiments.

Figure 17:
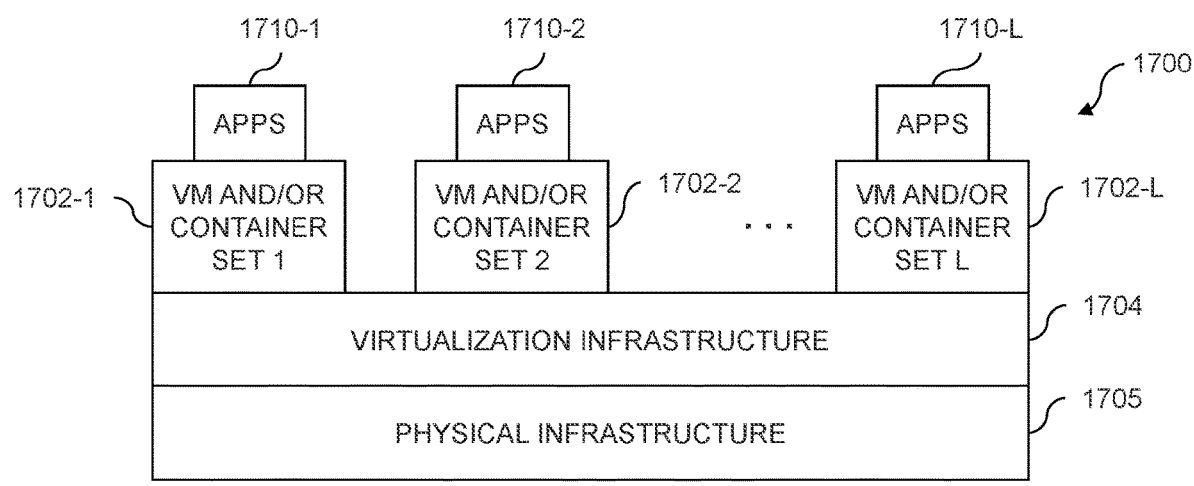
FIGS. 17 and 18 show examples of processing platforms that may be utilized to implement at least a portion of an information processing system in illustrative embodiments.
Figure 18:
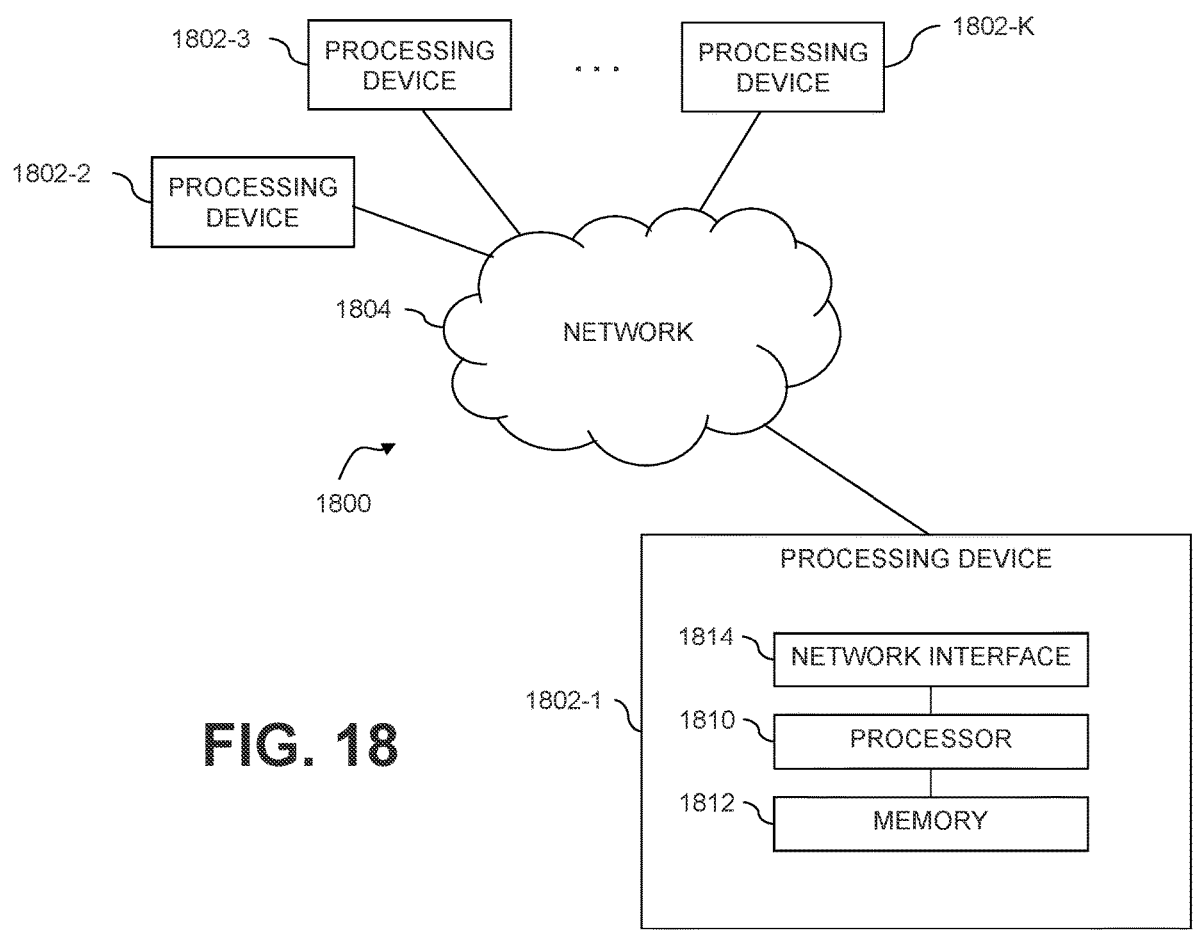

FIG. 17 shows an example processing platform comprising cloud infrastructure 1700. The cloud infrastructure 1700 comprises a combination of physical and virtual processing resources that may be utilized to implement at least a portion of the information processing system 100 in FIG. 1. The cloud infrastructure 1700 comprises multiple virtual machines (VMs) and/or container sets 1702-1, 1702-2, . . . 1702-L implemented using virtualization infrastructure 1704. The virtualization infrastructure 1704 runs on physical infrastructure 1705, and illustratively comprises one or more hypervisors and/or operating system level virtualization infrastructure. The operating system level virtualization infrastructure illustratively comprises kernel control groups of a Linux operating system or other type of operating system.

The cloud infrastructure 1700 further comprises sets of applications 1710-1, 1710-2, . . . 1710-L running on respective ones of the VMs/container sets 1702-1, 1702-2, . . . 1702-L under the control of the virtualization infrastructure 1704. The VMs/container sets 1702 may comprise respective VMs, respective sets of one or more containers, or respective sets of one or more containers running in VMs.

In some implementations of the FIG. 17 embodiment, the VMs/container sets 1702 comprise respective VMs implemented using virtualization infrastructure 1704 that comprises at least one hypervisor. A hypervisor platform may be used to implement a hypervisor within the virtualization infrastructure 1704, where the hypervisor platform has an associated virtual infrastructure management system. The underlying physical machines may comprise one or more distributed processing platforms that include one or more storage systems.

In other implementations of the FIG. 17 embodiment, the VMs/container sets 1702 comprise respective containers implemented using virtualization infrastructure 1704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1700 shown in FIG. 17 may represent at least a portion of one processing platform. Another example of such a processing platform is processing platform 1800 shown in FIG. 18.

The processing platform 1800 in this embodiment comprises a portion of system 100 and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1812 may comprise random access memory (RAM), read-only memory (ROM), flash memory or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for wear leveling between storage devices of a storage system based at least in part on IO patterns of storage objects as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, IO patterns, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured to perform steps of:
monitoring input/output operations for a plurality of storage objects for a designated period of time, each of the plurality of storage objects being stored on one of a set of two or more storage devices of a storage system;
identifying input/output patterns associated with respective ones of the plurality of storage objects, wherein different ones of the input/output patterns are associated with different wear level impacts on the set of two or more storage devices of the storage system;
determining a wear status of each storage device in the set of two or more storage devices of the storage system;
selecting one or more of the plurality of storage objects to move from a first storage device in the set of two or more storage devices of the storage system to a second storage device in the set of two or more storage devices of the storage system based at least in part on (i) the monitored input/output operations for the plurality of storage objects, (ii) the identified input/output patterns associated with respective ones of the plurality of storage objects, (iii) erase scores for the identified input/output patterns associated with the respective ones of the plurality of storage objects, the erase scores being determined based at least in part on one or more erase counts for the identified input/output patterns, and (iv) the determined wear status of each storage device in the set of two or more storage devices of the storage system; and
moving the selected one or more storage objects from the first storage device to the second storage device to perform wear level balancing among the set of two or more storage devices of the storage system.

2. The apparatus of claim 1 wherein the first storage device has a first wear level greater than a second wear level of the second storage device.

3. The apparatus of claim 1 wherein identifying a given input/output pattern associated with a given one of the plurality of storage objects is based at least in part on:
a size of the given storage object;
a ratio of read operations to write operations for the given storage object for the designated period of time; and
a ratio of sequential input/output operations to random input/output operations involving the given storage object for the designated period of time.

4. The apparatus of claim 1 wherein the set of two or more storage devices of the storage system are part of a same one of two or more storage tiers in the storage system.

5. The apparatus of claim 1 wherein the storage system comprises a clustered storage system comprising two or more storage arrays, wherein the first storage device and the second storage device are part of a given one of the two or more storage arrays, and wherein movement of the selected one or more of the plurality of storage objects improves wear level balancing of the given one of the two or more storage arrays.

6. The apparatus of claim 1 wherein the storage system comprises a clustered storage system comprising two or more storage arrays, wherein the first storage device is part of a first one of the two or more storage arrays, wherein the second storage device is part of a second one of the two or more storage arrays, and wherein the movement of the selected one or more of the plurality of storage objects improves wear level balancing between the first and second ones of the two or more storage arrays.

7. The apparatus of claim 1 wherein the first storage device and the second storage device comprise a same storage device type.

8. The apparatus of claim 7 wherein the same storage device type comprises a solid state drive type.

9. The apparatus of claim 1 wherein the selecting and moving steps are performed responsive to identifying that a wear level difference among the set of two or more storage devices of the storage system is greater than a designated threshold.

10. The apparatus of claim 9 wherein the determining, selecting and moving steps are repeated until the wear level difference among the set of two or more storage devices of the storage system is equal to or lower than the designated threshold.

11. The apparatus of claim 1 wherein determining the wear status for a given storage device in the set of two or more storage devices of the storage system is based at least in part on:
a wear level of the given storage device;
an input/output activity level of the given storage device; and
capacity usage of the given storage device.

12. The apparatus of claim 11 wherein the wear level of the given storage device is determined based at least in part on an accumulated write request count for the given storage device.

13. The apparatus of claim 11 wherein the input/output activity level of the given storage device is determined based at least in part on a sum of counts of the monitored input/output operations for a subset of the plurality of storage objects stored on the given storage device.

14. The apparatus of claim 1 wherein the one or more of the plurality of storage objects are selected based at least in part on storage object relocation unit temperature values associated with each of a subset of the plurality of storage objects stored on the first storage device, the storage object relocation unit temperature values being based at least in part on:
input/output activity levels of respective ones of the storage objects in the subset of the plurality of storage objects stored on the first storage device; and
the erase scores for the input/output patterns associated with respective ones of the storage objects in the subset of the plurality of storage objects stored on the first storage device, a given erase score for a given input/output pattern being determined based at least in part on an average erase count per input/output operation of the given input/output pattern and an average erase count per input/output operation of all input/output patterns.

15. A computer program product comprising a non-transitory processor-readable storage medium having stored therein program code of one or more software programs, wherein the program code when executed by at least one processing device causes the at least one processing device to perform steps of:
monitoring input/output operations for a plurality of storage objects for a designated period of time, each of the plurality of storage objects being stored on one of a set of two or more storage devices of a storage system;
identifying input/output patterns associated with respective ones of the plurality of storage objects, wherein different ones of the input/output patterns are associated with different wear level impacts on the set of two or more storage devices of the storage system;
determining a wear status of each storage device in the set of two or more storage devices of the storage system;
selecting one or more of the plurality of storage objects to move from a first storage device in the set of two or more storage devices of the storage system to a second storage device in the set of two or more storage devices of the storage system based at least in part on (i) the monitored input/output operations for the plurality of storage objects, (ii) the identified input/output patterns associated with respective ones of the plurality of storage objects, (iii) erase scores for the identified input/output patterns associated with the respective ones of the plurality of storage objects, the erase scores being determined based at least in part on one or more erase counts for the identified input/output patterns, and (iv) the determined wear status of each storage device in the set of two or more storage devices of the storage system; and
moving the selected one or more storage objects from the first storage device to the second storage device to perform wear level balancing among the set of two or more storage devices of the storage system.

16. The computer program product of claim 15 wherein identifying a given input/output pattern associated with a given one of the plurality of storage objects is based at least in part on:
a size of the given storage object;
a ratio of read operations to write operations for the given storage object for the designated period of time; and
a ratio of sequential input/output operations to random input/output operations involving the given storage object for the designated period of time.

17. The computer program product of claim 15 wherein the first storage device and the second storage device comprise a same storage device type.

18. A method comprising:
monitoring input/output operations for a plurality of storage objects for a designated period of time, each of the plurality of storage objects being stored on one of a set of two or more storage devices of a storage system;
identifying input/output patterns associated with respective ones of the plurality of storage objects, wherein different ones of the input/output patterns are associated with different wear level impacts on the set of two or more storage devices of the storage system;
determining a wear status of each storage device in the set of two or more storage devices of the storage system;
selecting one or more of the plurality of storage objects to move from a first storage device in the set of two or more storage devices of the storage system to a second storage device in the set of two or more storage devices of the storage system based at least in part on (i) the monitored input/output operations for the plurality of storage objects, (ii) the identified input/output patterns associated with respective ones of the plurality of storage objects, (iii) erase scores for the identified input/output patterns associated with the respective ones of the plurality of storage objects, the erase scores being determined based at least in part on one or more erase counts for the identified input/output patterns, and (iv) the determined wear status of each storage device in the set of two or more storage devices of the storage system; and
moving the selected one or more storage objects from the first storage device to the second storage device to perform wear level balancing among the set of two or more storage devices of the storage system;
wherein the method is performed by at least one processing device comprising a processor coupled to a memory.

19. The method of claim 18 wherein identifying a given input/output pattern associated with a given one of the plurality of storage objects is based at least in part on:
a size of the given storage object;
a ratio of read operations to write operations for the given storage object for the designated period of time; and
a ratio of sequential input/output operations to random input/output operations involving the given storage object for the designated period of time.

20. The method of claim 18 wherein the first storage device and the second storage device comprise a same storage device type.

* * * * *